US012631561B2

(12) United States Patent
Testa et al.

(10) Patent No.: US 12,631,561 B2
(45) Date of Patent: May 19, 2026

(54) SELECTIVE TIME-RESOLVED FLUORESCENCE ANISOTROPY WITH SWITCHABLE STATES

(71) Applicant: Rizer Biotech AB, Stockholm (SE)

(72) Inventors: Ilaria Testa, Solna (SE); Andrea Volpato, Solna (SE)

(73) Assignee: Rizer Biotech AB, Sandhamnsg (SE)

( * ) Notice: Subject to any disclaimer, the term of this patent is extended or adjusted under 35 U.S.C. 154(b) by 143 days.

(21) Appl. No.: 18/684,058

(22) PCT Filed: Aug. 18, 2022

(86) PCT No.: PCT/SE2022/050757
§ 371 (c)(1),
(2) Date: Feb. 15, 2024

(87) PCT Pub. No.: WO2023/022647
PCT Pub. Date: Feb. 23, 2023

(65) Prior Publication Data
US 2024/0353330 A1 Oct. 24, 2024

(30) Foreign Application Priority Data
Aug. 19, 2021 (SE) ..................................... 2130221-1

(51) Int. Cl.
*G01N 21/64* (2006.01)

(52) U.S. Cl.
CPC ..... *G01N 21/6445* (2013.01); *G01N 21/6408* (2013.01); *G01N 2201/06113* (2013.01); *G01N 2201/0683* (2013.01)

(58) Field of Classification Search
CPC ........... G01N 21/6445; G01N 21/6408; G01N 2201/06113; G01N 2201/0683
See application file for complete search history.

(56) References Cited

U.S. PATENT DOCUMENTS

2006/0234279 A1* 10/2006 Miller .................. G01N 33/542
435/7.1
2012/0077282 A1 3/2012 Katzlinger et al.

FOREIGN PATENT DOCUMENTS

EP 2801854 A1 11/2014
WO WO-2010/062364 A1 6/2010
(Continued)

OTHER PUBLICATIONS

Extended European Search Report for EP22858845.5 that claims priority to the same parent application as the instant application; Dated May 13, 2025; 11 pages.
(Continued)

*Primary Examiner* — Uzma Alam
*Assistant Examiner* — Fani Polyzos Boosalis
(74) *Attorney, Agent, or Firm* — Harness, Dickey & Pierce, P.L.C.; Anthony G. Fussner

(57) ABSTRACT

A method for measuring polarization and anisotropy of fluorophores comprises activating reversibly switchable fluorophores in a sample. The activating comprises applying of a first activation light pulse of a wavelength suitable for switching the reversibly switchable fluorophores into a long-lived photo-selected state. Polarization and anisotropy of the reversibly switchable fluorophores in the long-lived photo-selected state are read out. The reading out in turn comprises applying of a read-out light pulse and detecting emission from the reversibly switchable fluorescent proteins. The first activation light pulse or the read-out light pulse comprises non-polarized light or circularly polarized light. The other one of the first activation light pulse and the read-out light pulse comprises linearly polarized light. A system for measuring polarization and anisotropy of fluorophores is also disclosed.

20 Claims, 15 Drawing Sheets

(56) References Cited

FOREIGN PATENT DOCUMENTS

WO      WO-2019245946  A1     12/2019
WO      WO-2020016887  A1      1/2020

OTHER PUBLICATIONS

Alvelid, Doctoral Thesis, "Automating STED microscopy for functional and structural live-cell imaging" Nov. 19, 2021; 123 pages.
Masullo et al, "Enhanced photon collection enables four dimensional fluorescence nanoscopy of living systems"; Article No. 3281; Aug. 16, 2018; 25 pages.
Ojha et al, "Imaging of fluorescence anisotropy during photoswitching provides a simple readout for protein self-association", Nature Communications 11, Article No. 21; Jan. 7, 2020; 11 pages.
International Search Report and Written Opinion for PCT/SE2022/050757 that is the parent application to the instant application; dated Nov. 9, 2022; 14 pages.
Ilaria Testa, et al.; "Nanoscale separation of molecular species based on their rotational mobility"; Optics Express, vol. 16, No. 25, Dec. 8, 2008, pp. 21093-21104.
European Office Action for EP22858845.5 that claims priority to the same parent application as the instant application; Feb. 9, 2026; 12 pages.

* cited by examiner

DETECTION

POLARIZ.

TIME $\Delta t_1$ $\Delta t_2$ $\Delta t_3$

INTENSITY $\Delta t_1$ $\Delta t_2$ $\Delta t_3$ t

COUNTS

1400

1300

1200

$10^{-10}$ $10^{-8}$ $10^{-6}$ $10^{-4}$ TIME (s)

DETECTION

POLARIZ.

TIME t    t

INTENSITY t

ANISOTROPY

TIME (s)

SELECTIVE TIME-RESOLVED FLUORESCENCE ANISOTROPY WITH SWITCHABLE STATES

This patent application is a U.S. national stage filing under 35 U.S.C. § 371 of PCT International Application No. PCT/SE2022/050757 filed Aug. 18, 2022 (published as WO 2023/022647 on Feb. 23, 2023), which claims priority to and the benefit of Swedish Patent Application No. 2130221-1 filed Aug. 19, 2021. The entire contents of these applications are incorporated herein by reference.

TECHNICAL FIELD

The present technology refers in general to methods and devices using time-resolved fluorescence and in particular to selective time-resolved fluorescence anisotropy measurement methods and devices.

BACKGROUND

Molecular complexes formation are the basic pillars of all cellular processes. However, state-of-the-art techniques have limitation in precisely, efficiently and specifically observe them, especially in living cells. Fluorescence resonance energy transfer (FRET) reveals interaction in 1-10 nm but its efficiency depends on the stoichiometry and abundance of donor/acceptor, which is not trivial to control in living cells. Time resolved fluorescence anisotropy (TR-FA) can specifically detect changes in mass but only of small molecules (0.1-30 KDa), which leaves out the majority of the human proteome.

Rotational diffusion provides direct information on the "mass spectrum" and local environment of molecular complexes in solution and cells. It is usually measured via fluorescence anisotropy (FA) in steady-state and time-resolved (TR-FA) modes, which probe changes in molecular orientation over a time window defined by the fluorescence lifetime, which is 1-5 ns for frequently used fluorophores. FA is widely used within the life sciences for drug screening applications and other small molecule binding assays due to its molecular specificity and sensitivity, high throughput, and compatibility with microscopy. However, TR-FA cannot reveal binding in most of the human proteome, because the molecular complexes are too large, i.e., they tumble too slowly to be distinguished from stationary within the nanosecond-scale time-window of conventional TR-FA.

In the published international patent application WO 2019/245946 A1, methods and apparatuses for inferring protein binding based on rotational diffusion of a collection of fluorophores are disclosed. A first light pulse is applied to excite a plurality of fluorophores in the collection of fluorophores to produce a plurality of excited fluorophores. The first light pulse has a first polarization, and the plurality of excited fluorophores has a component of their orientation aligned with the first polarization. A second light pulse is applied to stimulate emission by the plurality of excited fluorophores. The second light pulse has a second polarization orthogonal to the first polarization. After a time delay following the application of the second light pulse, third light pulse of the second polarization is applied to further stimulate emission by the plurality of excited fluorophores. Polarized emissions from the plurality of excited fluorophores are detected. The rate of rotational diffusion of the collection of fluorophores is inferred based on the detected polarized emissions. This approach will allow finer polarization and anisotropy measurements by the increased precision in photo-selection, i.e., the angular narrowing. Also, by using activation of long-lived fluorophores, a longer timescale is reachable, thereby enabling measurements on larger molecules. However, the approach has the drawback of suffering from homo-fret interference.

There is therefore still a need for improving detection of rotational diffusion of larger molecules.

SUMMARY

A general object of the present technology is thus to provide methods and devices improving reliable monitoring of rotational diffusion of large molecules.

The above object is achieved by methods and devices according to the independent claims. Preferred embodiments are defined in dependent claims.

In general words, in a first aspect, a method for measuring polarization and anisotropy of fluorophores comprises activating reversibly switchable fluorophores in a sample. The activating comprises applying of a first activation light pulse of a wavelength suitable for switching the reversibly switchable fluorophores into a long-lived photo-selected state. Polarization and anisotropy of the reversibly switchable fluorophores in the long-lived photo-selected state are read out. The reading out in turn comprises applying of a read-out light pulse and detecting emission from the reversibly switchable fluorescent proteins. The first activation light pulse or the read-out light pulse comprises non-polarized light or circularly polarized light. The other one of the first activation light pulse and the read-out light pulse comprises linearly polarized light.

In a second aspect, a system for measuring polarization and anisotropy of fluorophores comprises a sample volume, a first illumination arrangement, a second illumination arrangement, a detector and a control arrangement. The sample volume is configured for receiving a sample. The first illumination arrangement comprising a first laser. The first laser is arranged for illuminating at least a part of the sample volume by a first activation light pulse. The first laser has a wavelength suitable for switching the reversibly switchable fluorophores into a long-lived photo-selected state. The second illumination arrangement comprises a second laser. The second laser is arranged for illuminating the at least a part of the sample volume by a read-out light pulse. The detector is arranged for detecting light emitted from the at least a part of the sample volume. The control arrangement is configured for controlling a common operation of the first illumination arrangement and the second illumination arrangement. The first illumination arrangement or the second illumination arrangement is configured for providing non-polarized light or circularly polarized light as the first activation light pulse or the read-out light pulse, respectively. The other one of the first illumination arrangement and the second illumination arrangement is configured for providing polarized light as the first activation light pulse or the read-out light pulse, respectively.

One advantage with the proposed technology is that rotational diffusion and molecular orientation of molecules can be measured with high specificity and high sensitivity in vitro and in cells. The method enables studies of molecular assemblies/disassembles as in drug-antigen interaction or viral maturation, molecular orientation for structural biology studies. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present technology consists of a system and method for probing the rotational diffusion properties of systems labelled with reversible switchable fluorescent probes.

Figures 1, 2, 3:
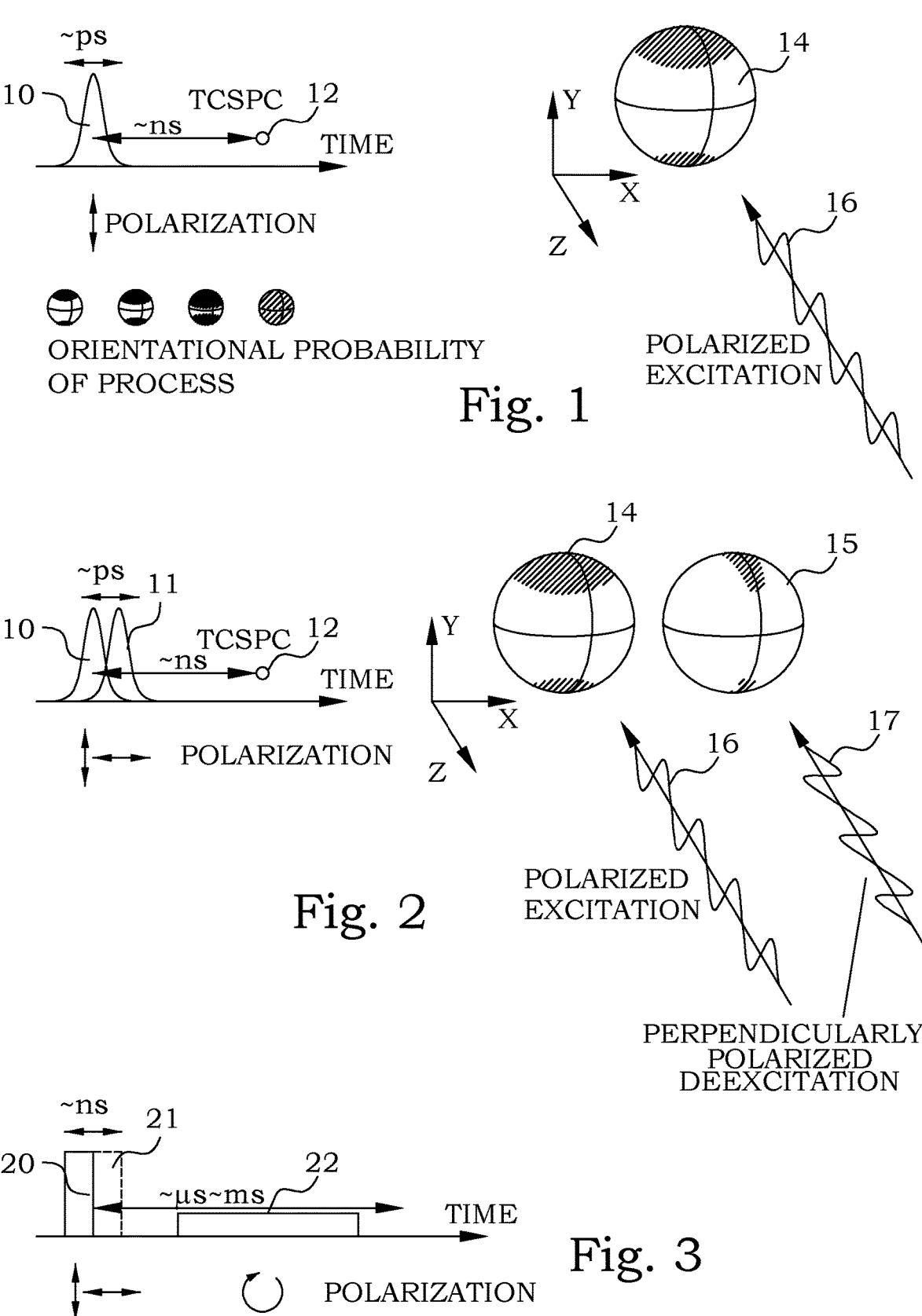
FIG. 1 is a schematic illustration of traditional time-resolved fluorescence anisotropy.
FIG. 2 is a schematic illustration of fluorescence anisotropy with angular narrowing.
FIG. 3 is a schematic illustration of a STARSS-RESOLFT approach.

Traditional time-resolved fluorescence anisotropy (TR-FA) is schematically illustrated in FIG. 1. A short light pulse, typically linearly polarized, with a duration of the order of picoseconds is used to excite fluorescent species. As the sphere indicates, this results in an excitation of fluorescent species with directions being close to the polarization direction. When time goes, the excited fluorescent species will de-excite, sending out fluorescent radiation, typically with the order of magnitude of nanoseconds. At the same time, the fluorescent species may move and rotate, which may result in that the fluorescent radiation does not have the same polarization direction as the original exciting light pulses. This information is used for deducing data concerning tumbling rates. However, the tumbling time is limited to the nanosecond range and the original angular definition is not very narrow, which reduces the possible use of this approach.

In this disclosure, a novel approach for monitoring molecular complexes formation, named Selective Time-resolved Anisotropy with Reversibly Switchable States (STARSS), is presented to bypass the current fundamental limit of fluorescence anisotropy measurement by increasing the photo-selection accuracy and by extending the observable temporal window through photo-switching.

STARSS can measure anisotropy values previously not accessible in both solution and living cells, for example allowing plasma membrane orientationally studies. By rigidly labelling reversibly switchable fluorophores, e.g. fluorescent proteins (rsFPs), to molecular complexes, their diverse tumbling rate at the sub-cellular level can be accessed, with the possibility of inferring binding states. As tumbling rates are directly connected to complex formation, STARSS may be used to unravel the HIV maturation states in ensemble and down to the single virion level. The STARSS approach is compatible with conventional and super resolution fluorescence microscopy and it is generally applicable to most of the human proteome studies since the observable is no more limited by the molecular weight. It is foreseen that the present approach will revolutionize the way molecular interaction are measured paving the way to new application in situ at high throughout.

The STARSS concept and set-up was created to measure rotational diffusion and molecular orientation of molecules with high specificity and high sensitivity in vitro and in cells. The method will be used to study: molecular assemblies/disassembles as in drug-antigen interaction or viral maturation, molecular orientation for structural biology studies.

The new concept is based on fluorescence and can be coupled to microscopy. Different optical implementations of the method are introduced which can be used for high throughput studies of molecular interactions in cells or high sensitivity studies of molecular interaction in complexes in cells or solution. It required specific molecular transitions in fluorescence probes such as stimulated emission or other form of photo-switching such as protonation/deprotonation and cis/trans isomerization.

Several variations of the STARSS concept are proposed. One difference is the photophysical process behind the switchable transitions of the fluorescent probe. In an approach named STARSS-STED use of excitation and stimulated emission depletion of fluorophores is utilized. This is related to e.g. the techniques disclosed in the published international patent application WO 2019/245946 A1.

FIG. 2 illustrates schematically the STARSS-STED approach. The schematic representation of the orientational probability of excitation of an ensemble of chromophores after photoselection is illustrated together with a graphical representation of the pulse schemes. As shown in FIG. 2, STARSS-STED will allow finer polarization and anisotropy measurements by increasing the precision in photo-selection (angular narrowing). This is achieved with the indicated pulse scheme, i.e., a pump-probe time-resolved anisotropy experiment, which aims to read-out anisotropy far beyond the time limit imposed by the one-two-three-photon absorption angular probabilities. The experiment consists of a polarized pulse (pulse width-10-100 ps) follow by a stimulated emission depletion pulse (0.2-1 ns) with orthogonal orientation. When needed, an additional stimulated emission depletion pulse can be added to further increase photo-selection. This allows for performing experiments for fine study of molecular orientation in vitro and in vivo. Suitable fluorescent molecules are all the one that can be efficiently depleted via stimulated emission, making this approach easily translatable.

The remaining drawbacks are at least to a part avoided by using the alternative approach STARSS-RESOLFT. STARSS-RESOLFT borrows the fluorescent probes from RESOLFT super-resolution techniques, i.e. it exploits rsFPs. Other types of photo-switching/luminescence might be used adapting the pulse schemes proposed here.

As shown in FIG. 3 STARSS-RESOLFT consists of a pump-probe time-resolved anisotropy approach, which aims to read-out anisotropy far beyond the time limit imposed by fluorescence lifetime. By activating rsPFs with an activation light pulse 20, another time scale is reached compared to traditional fluorescence measurements. If, as in this embodiment, linearly polarized activation is used, the angular resolution may be narrowed by a perpendicularly polarized deactivation light pulse 21. These light pulses may have durations within the nanosecond range. By then reading out the conditions of the rsPFs with a light pulse 22, time regions of microseconds or even milliseconds can be reached. The read-out is made by another type of polarity compared to the activation. In this embodiment, the read-out light pulse is circularly polarized. Other possibilities are described further below.

Figure 4:
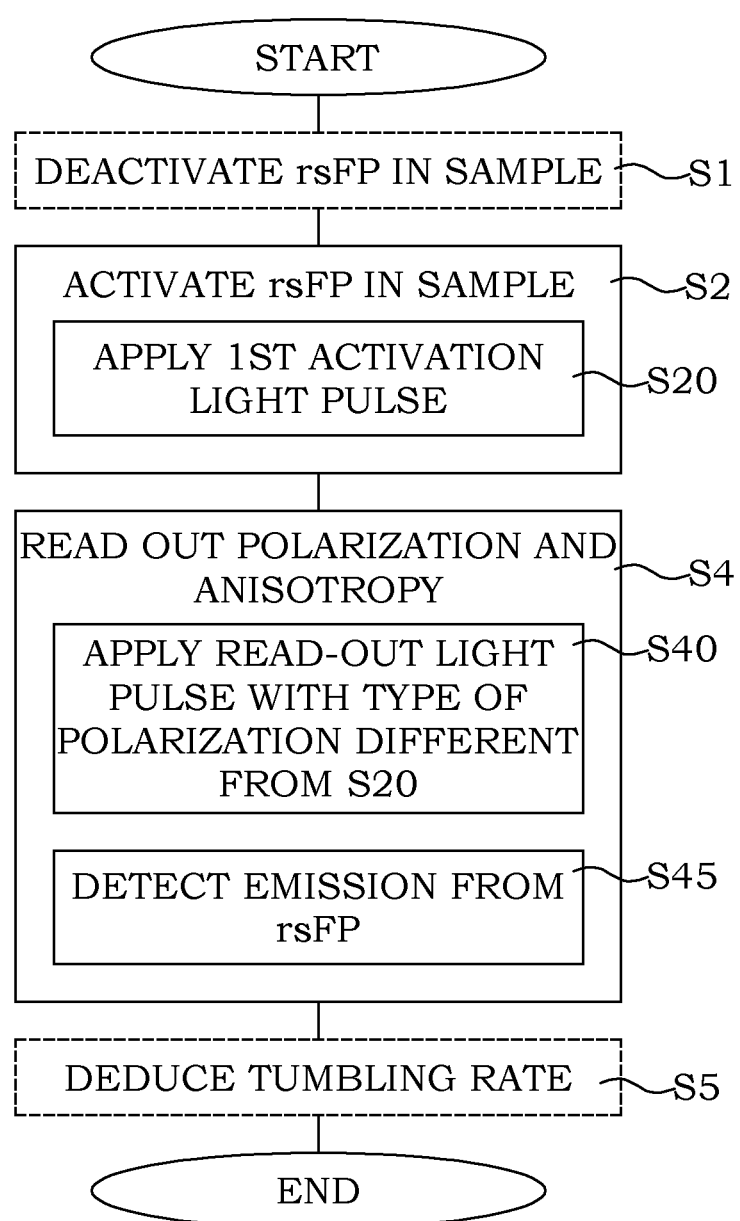
FIG. 4 is a flow diagram of steps of an embodiment of a method for measuring polarization and anisotropy of fluorophores.

FIG. 4 is a flow diagram of steps of an embodiment of a method for measuring polarization and anisotropy of fluorophores. In step S2, reversibly switchable fluorophores, such as e.g. fluorescent proteins, in a sample are activated. To this end, this step of activating S2 comprises a step S20 of applying a first activation light pulse of a wavelength suitable for switching the reversibly switchable fluorophores into a long-lived photo-selected state. In step S4, polarization and anisotropy of the reversibly switchable fluorophores in the long-lived photo-selected state are read out. This step of reading out S4 in turn comprises step S40, in which a read-out light pulse is applied. Step S4 further comprises the step S45, in which emission from the reversibly switchable fluorophores are detected. One of the first activation light pulse and the read-out light pulse comprises one of non-polarized light and circularly polarized light and the other one of the first activation light pulse and the read-out light pulse comprises linearly polarized light. In other words, the read-out light pulse has a different polarization type compared to the first activation light pulse.

The use of different types of polarization for the activation and the read-out enables an analysis of the detected emission that does not suffer from uncontrolled homo-FRET interference.

In a preferred embodiment, the method for measuring polarization and anisotropy of fluorophores comprises the further step S1. In step S1, all the reversibly switchable fluorophores in the sample are deactivated prior to the step S2 of activating them. By this, it is assured that there are no remains from any earlier activation steps that could interfere with the intended procedure.

In a preferred embodiment, the method for measuring polarization and anisotropy of fluorophores comprises the further step S5. In step S5, a tumbling rate is deducing based on time evolutions of the emission obtained in the step of detecting S45. This evaluation of the tumbling rate may typically be performed if the data is good and allow an appropriate model fitting. In one application, the reversibly switchable fluorophores are bonded to molecular complexes, whereby the tumbling rate is a tumbling rate for the molecular complexes.

Figure 5:
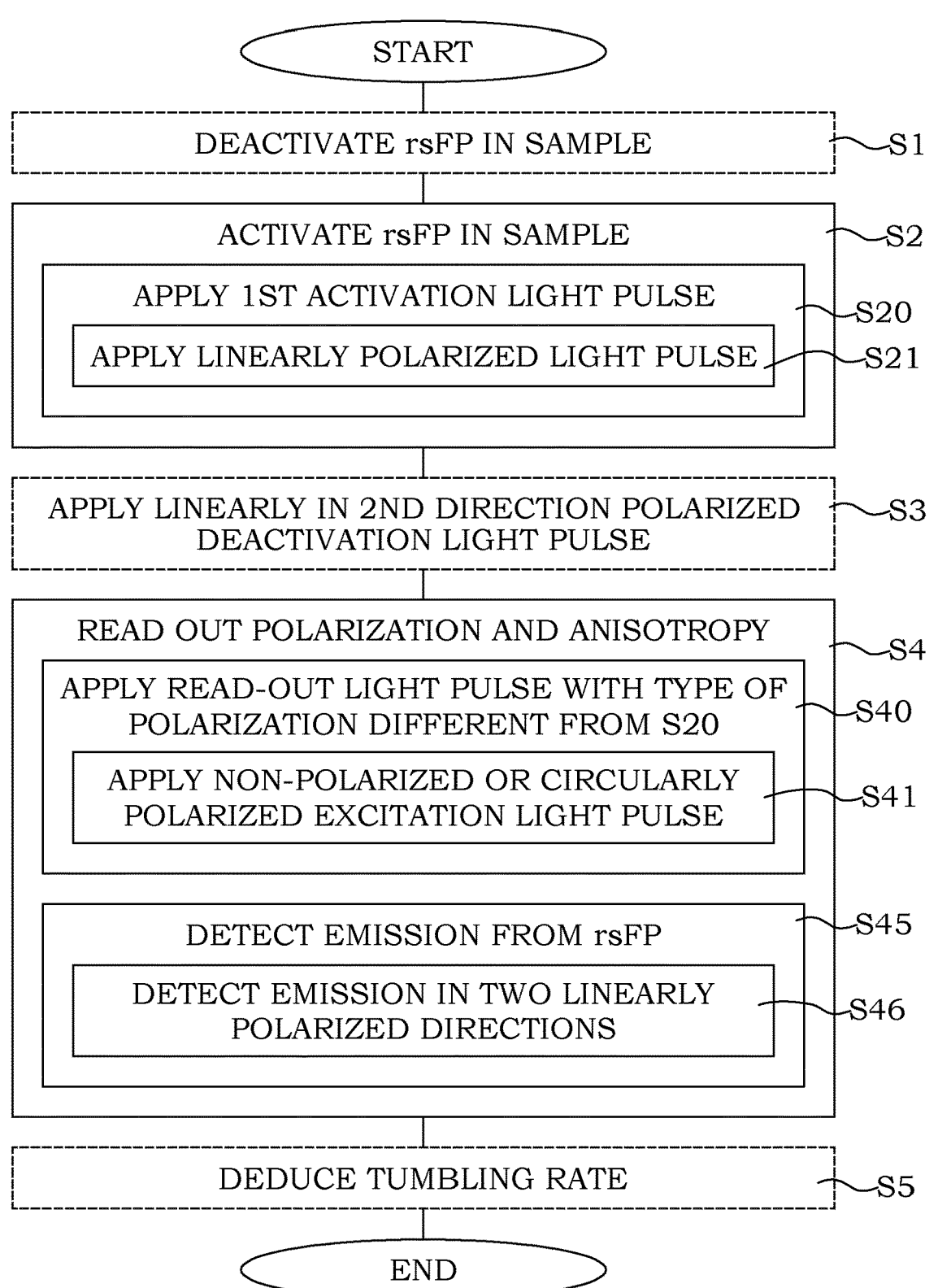
FIG. 5 is a flow diagram of steps of another embodiment of a method for measuring polarization and anisotropy of fluorophores.

FIG. 5 is a flow diagram of steps of a further embodiment of a method for measuring polarization and anisotropy of fluorophores. Similar steps as in FIG. 4 are present and are not discussed again. However, further specifications and steps are included.

Step S20 of applying a first activation light pulse comprises a step S21. In step S21, a first activation light pulse, linearly polarized in a first direction, is applied. Furthermore, step S40 of applying a reading-out light pulse comprises a step S41. In step S41, a read-out light pulse, being a non-polarized or circularly polarized excitation light pulse of a wavelength suitable for fluorescent excitation of the reversibly switchable fluorophores in the long-lived photo-selected state is applied.

In this embodiment, the step S45 of detecting emission comprises the step S46. In step S46 fluorescent emission polarized in the first direction is detected and fluorescent emission polarized in a second direction perpendicular to the first direction is also detected.

In order to improve the precision in photo-selection by angular narrowing, in a preferred embodiment, the method for measuring polarization and anisotropy of fluorophores comprises the further step S3. In step S3, a deactivation light pulse is applied. The deactivation light pulse has a wavelength that is suitable for switching the reversibly switchable fluorophores that are present in the long-lived photo-selected state into a non-photo-selected state. The deactivation light pulse is polarized in the second direction. This step S3 of applying the deactivation light pulse occurs between the step of activating S2 and the step of reading out S4.

In one embodiment, the steps of applying an excitation light S41 and detecting fluorescent emission S46 take place continuously or intermittently.

Figure 6:
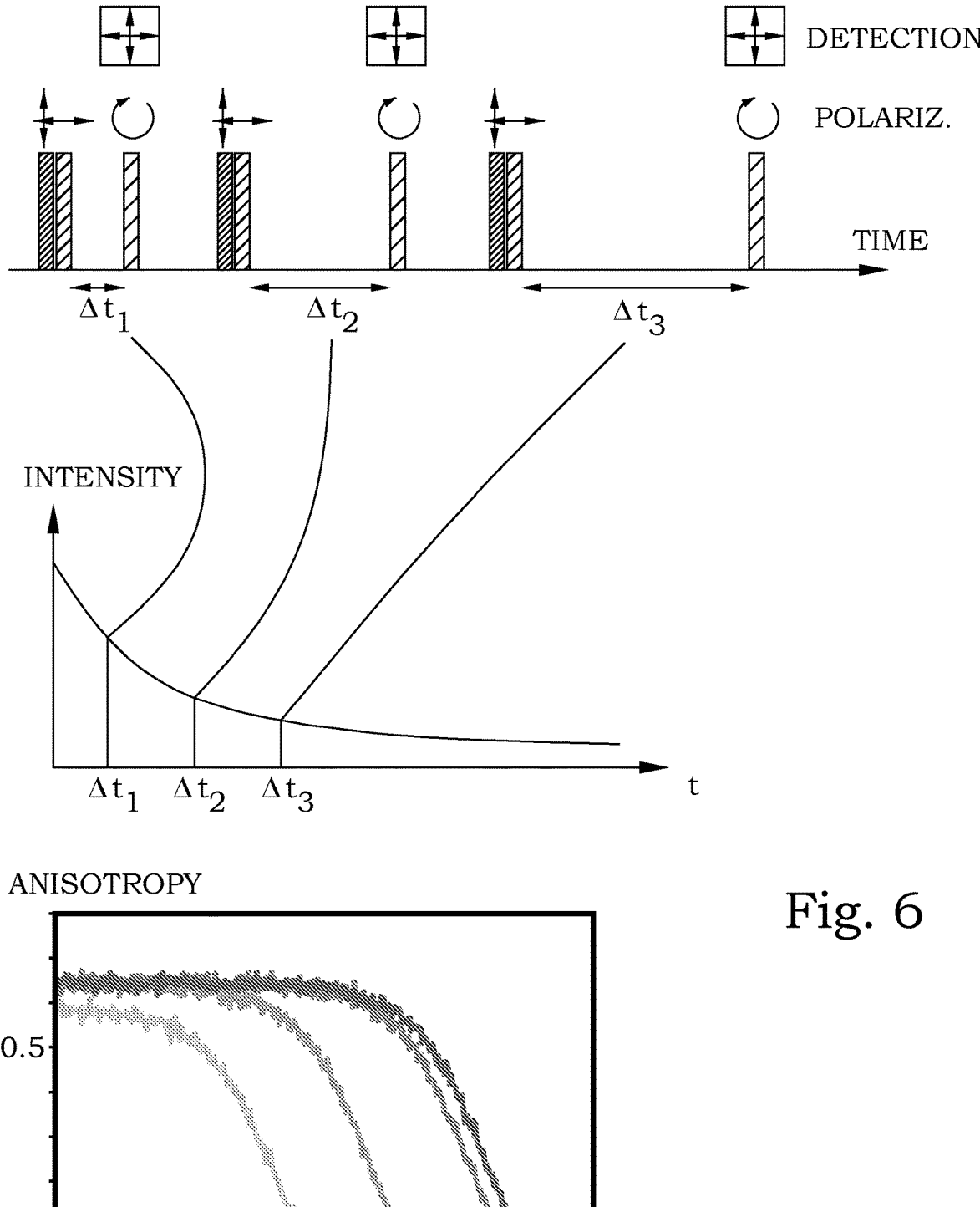
FIG. 6 is a schematic illustration of the measurement approach of the method embodiment of FIG. 5.

The embodiment above can be described as a STARSS-RESOLFT method with on state photo-selection and normal off state angular saturation. As shown in FIG. 6, it consists of a pump-probe time-resolved anisotropy experiment, which aims to read-out anisotropy far beyond the time limit imposed by fluorescence lifetime. A long-lived orientational photo-selected state is created with perpendicularly polarized on-switching and off-switching pulses. After a time delay, a circularly polarized readout pulse probes the system inducing emission of fluorescence, preferably in two perpendicularly polarized channels. The experiment is repeated changing the time delay between the pump section of the experiment and the probe pulse. It is expected to enable to tune the anisotropy sensitivity range adjusting on-switching and off-switching timing and intensities. Preliminary simulations highlight the potential gain in sensitivity of this method, which can distinguish anisotropy curves with diffusion times of several microseconds, which cannot be discerned with conventional current methods. These values correspond to molecular sizes of tens of nanometers, which for example would enable to detect molecules binding to ribosomes versus free diffusing ones. Experiments can be performed to address the time-scales of photo-selection for different probes featuring reversible switchable states. Suitable fluorescent molecules are all reversible switchable fluorescent proteins and organic dyes like rsEGFP2, Dronpa etc. which can undergo cis-trans isomerization without major loss in dipole orientation.

In FIG. 6, hatched rectangles represent illumination time window hatch-coded for on-switching (close hatching), off-switching (medium hatching) and readout (sparse hatching).

Arrows on top of the pulse schemes represent light polarization quality, which could be linear or circular. Boxes on top of readout pulses code the detection scheme which could be dual channel and polarization sensitive (two perpendicular arrows) or single channel and non-polarization sensitive (circular arrow). Simulated observables for the proposed experiment are also shown.

Figure 7:
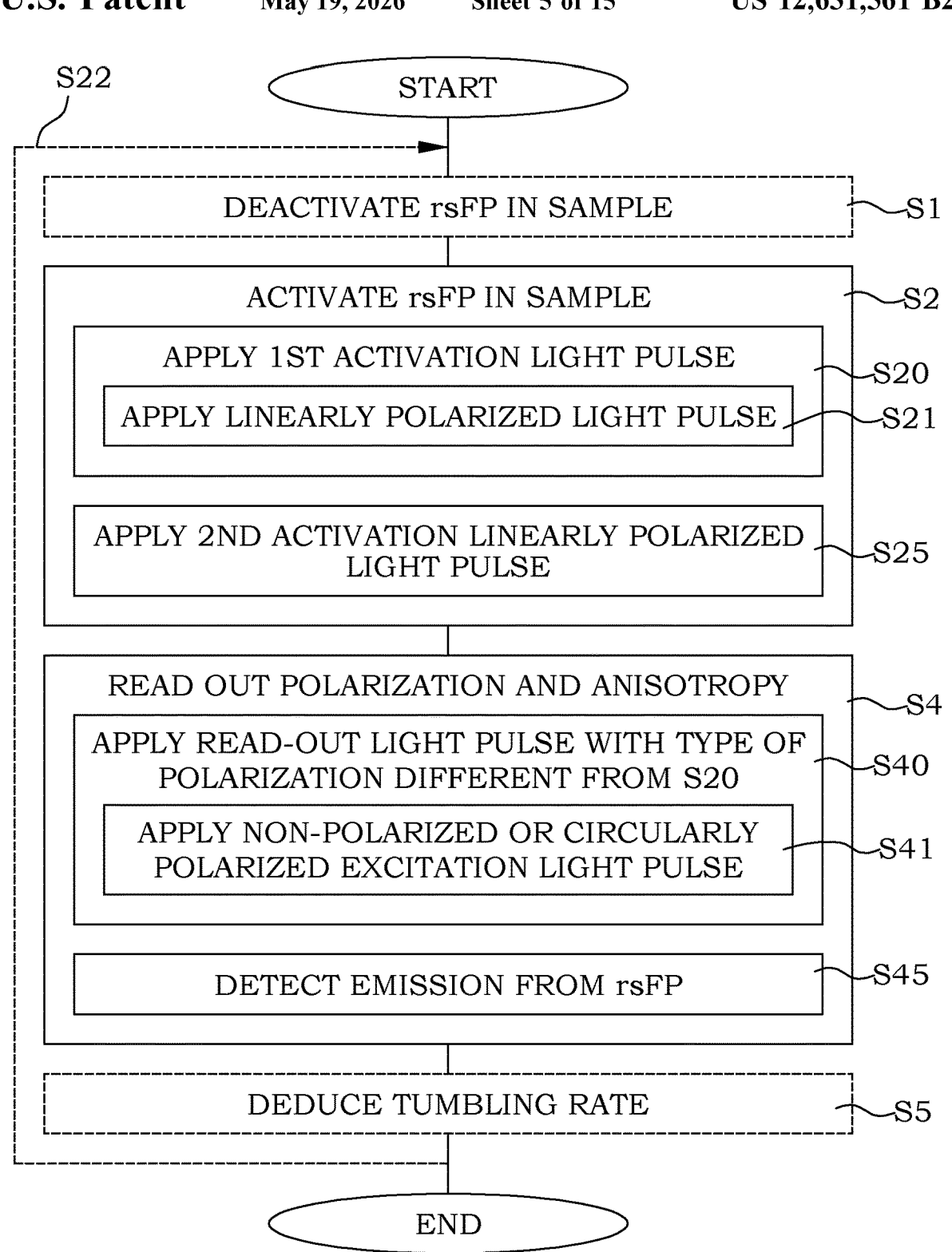
FIG. 7 is a flow diagram of steps of yet another embodiment of a method for measuring polarization and anisotropy of fluorophores.

FIG. 7 is a flow diagram of steps of another further embodiment of a method for measuring polarization and anisotropy of fluorophores. Similar steps as in FIG. 4 are present and are not discussed again. However, further specifications and steps are included.

Step S20 of applying a first activation light pulse comprises a step S21. In step S21, a first activation light pulse, linearly polarized in a first direction, is applied. Furthermore, step S40 of applying a reading-out light pulse comprises a step S41. In step S41, a read-out light pulse, being a non-polarized or circularly polarized excitation light pulse of a wavelength suitable for fluorescent excitation of the reversibly switchable fluorophores in the long-lived photo-selected state is applied.

In this embodiment, the step of activating S2 further comprises a step S25. In step S25, a second activation light pulse of the wavelength suitable for switching the reversibly switchable fluorophores into a long-lived photo-selected state is applied. The second activation light pulse is polarized in the first direction, i.e., in the same direction as the first activation light pulse. The applying of the second activation light pulse is delayed by a non-zero delay time with respect to the first activation light pulse.

The second activation light pulse serves for activating reversibly switchable fluorophores that are aligned in the direction of the polarization but was not activated by the first activation light pulse. A major part of these are reversibly switchable fluorophores that during the delay time has rotated from a non-aligned direction into the polarization direction. It is thus easily understood that the time delay between the two activation light pulses can be used to probe different molecule sizes. Furthermore, if similar measurements, but with different delay times, are available, additional kinetic information may be deduced.

To this end, in a preferred embodiment, the method for measuring polarization and anisotropy of fluorophores comprises a repetition, as indicated by the broken arrow S22, of the steps of activating S2 and reading out S4 with different delay times between the first and second activation light pulses. Preferably, the step S1 of deactivating the reversibly switchable fluorophores is preferably performed between each repetition, in order to remove any interdependencies.

Figure 8:
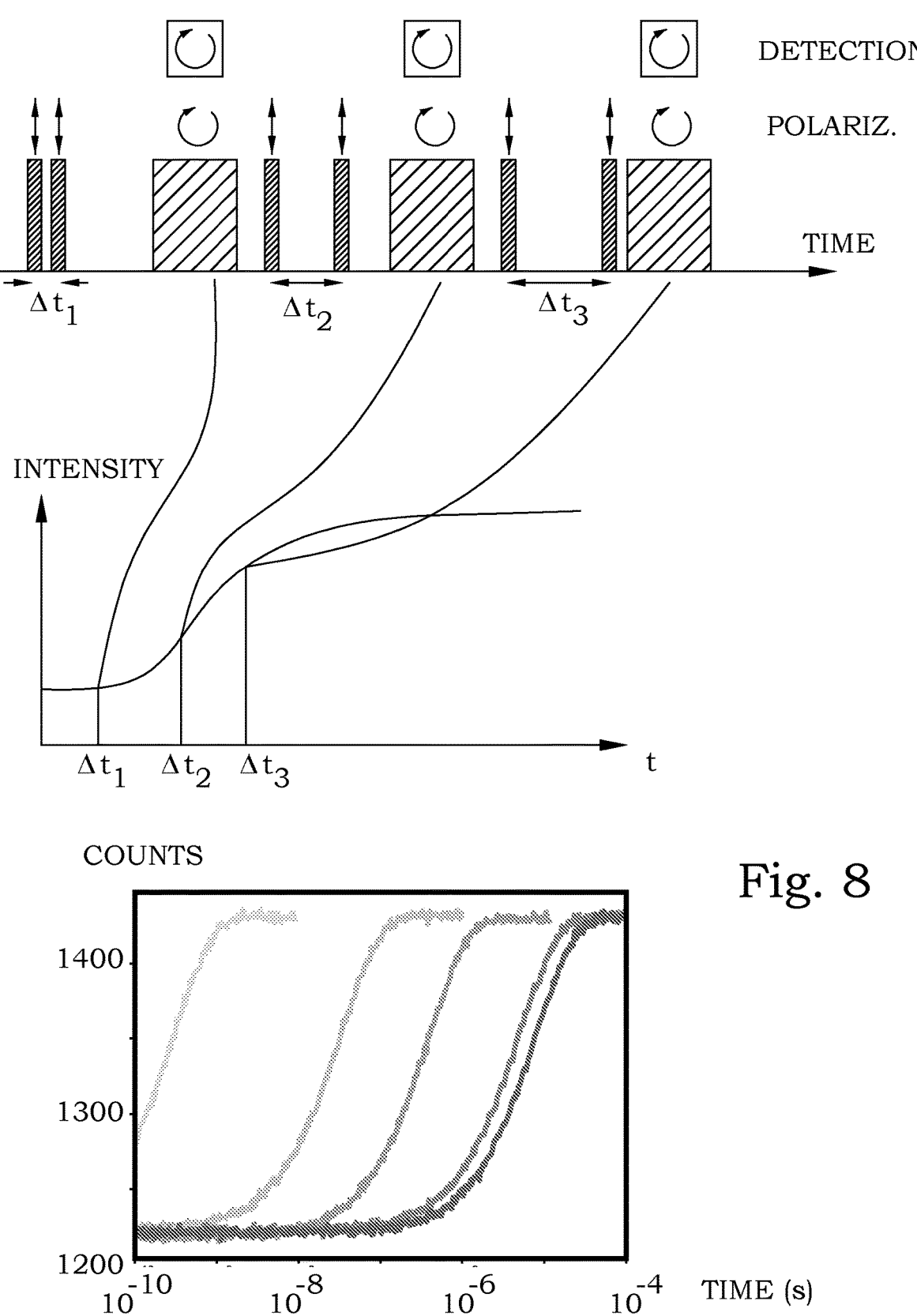
FIG. 8 is a schematic illustration of the measurement approach of the method embodiment of FIG. 7.

The embodiment above can be described as a STARSS-RESOLFT method with on state selection. As shown in FIG. 8 it is a double-pulse on-switching experiment with subsequent readout. The first on-switching pulse acts as a pump and generates a polarized population of active rsFPs, with a sufficient power to saturate the fluorophores aligned with the polarization plane of the light. After a temporal delay, the second pulse will activate again the fluorophores aligned with the same polarization plane. If, after the first pulse, molecules had time to diffuse away from the polarization plane and to be replaced by fresh inactive molecules than the total non-polarized readout signal will increase. This experiment greatly simplifies detection hardware requirements and can be coupled to detectors with high quantum efficiency and dynamic range making STARSS more sensitive for applications targeted to identification of low abundance macromolecular complexes. Nevertheless, it requires higher illumination intensities than embodiment of FIG. 6 because it relies on the complete switching of the fluorescent molecule population into the on state.

The hatchings in FIG. 8 are similar as in FIG. 6. Simulated observables for the proposed experiment are also shown.

Figure 9:
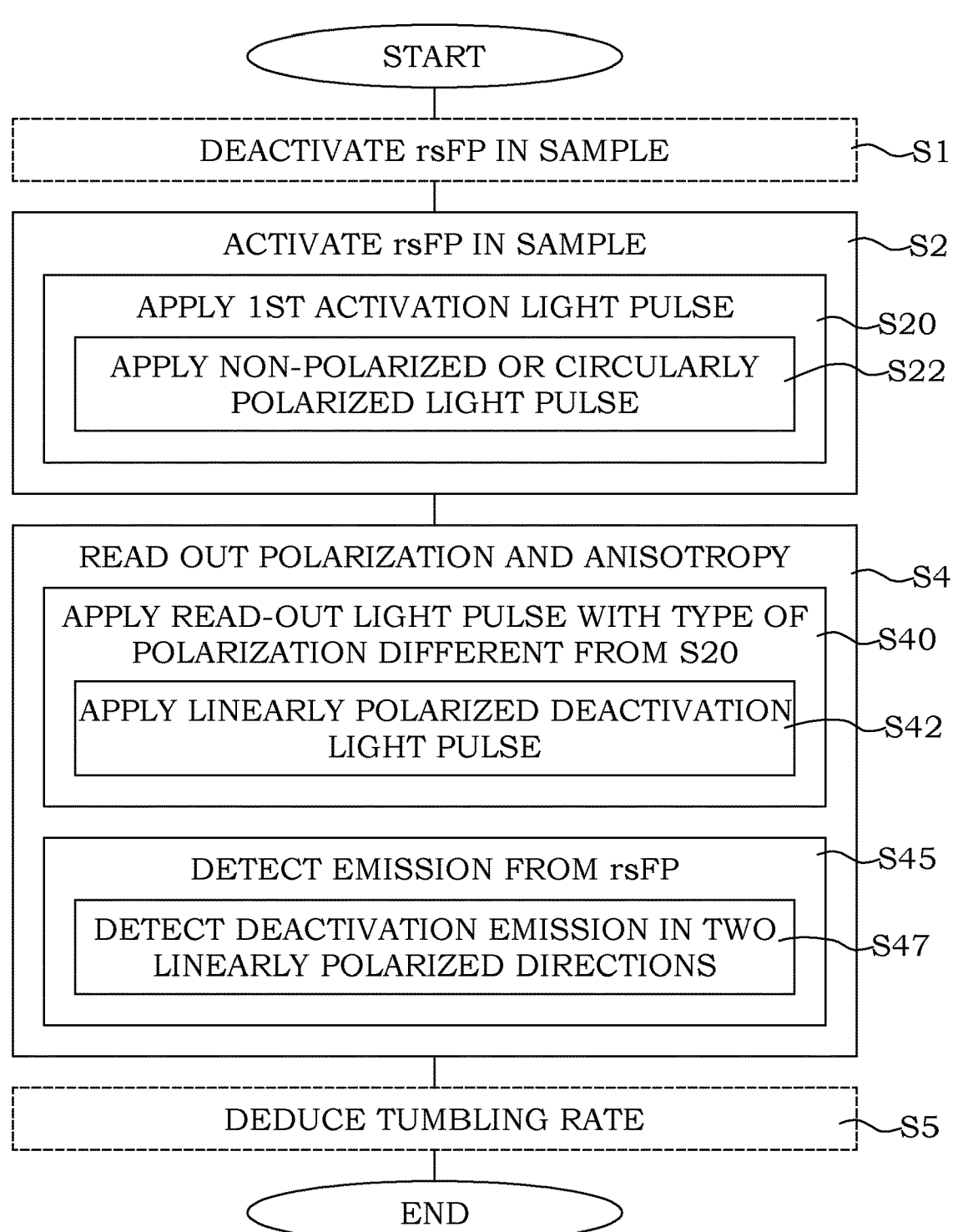
FIG. 9 is a flow diagram of steps of yet another embodiment of a method for measuring polarization and anisotropy of fluorophores.

FIG. 9 is a flow diagram of steps of yet another further embodiment of a method for measuring polarization and anisotropy of fluorophores. Similar steps as in FIG. 4 are present and are not discussed again. However, further specifications and steps are included.

Step S20 of applying a first activation light pulse comprises a step S22. In step S21, a non-polarized or circularly polarized activation light pulse is used as the first activation light pulse. Furthermore, step S40 of applying a reading-out light pulse comprises a step S42. In step S42, a read-out light pulse is used, which is a deactivation light pulse of a wavelength suitable for switching the reversibly switchable fluorophores being in the long-lived photo-selected state into a non-photo-selected state. The deactivation light pulse being polarized in a first direction.

In a preferred embodiment, the step S45 of detecting emission comprises the step S47. In step S47, emission associated with the deactivation polarized in the first direction is detected and emission associated with the deactivation polarized in a second direction perpendicular to the first direction is detected.

In this embodiment, where the activation is made by the non-polarized or circularly polarized light pulses, it is of benefit if as much of the targeted molecules are activated. To this end, the duration of the light pulses can be utilized. Therefore, in a preferred embodiment, a duration of the first activation light pulse is adapted to cause a majority of all the reversibly switchable fluorescent proteins, and preferably more than 95% of all the reversibly switchable fluorescent proteins, being irradiated to switch into the long-lived photo-selected state.

Figure 10:
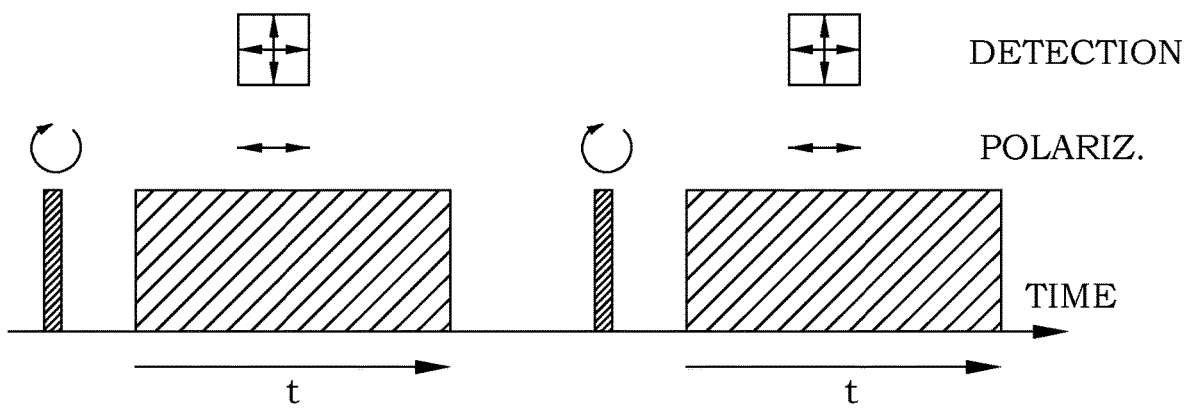
FIG. 10 is a schematic illustration of the measurement approach of the method embodiment of FIG. 9.
Figure 10:
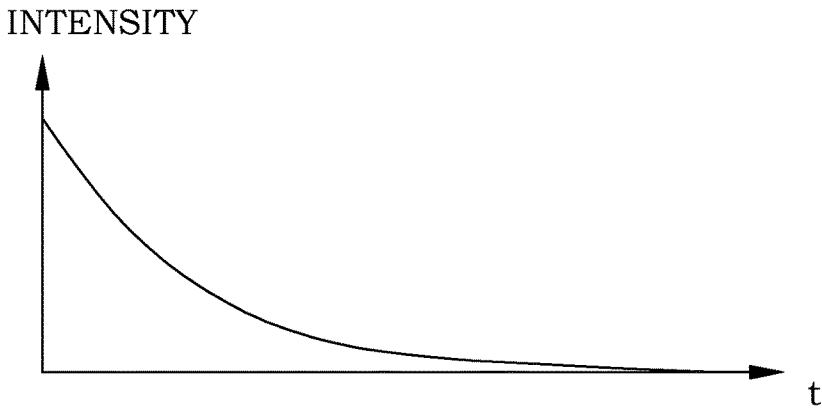
Figure 10:
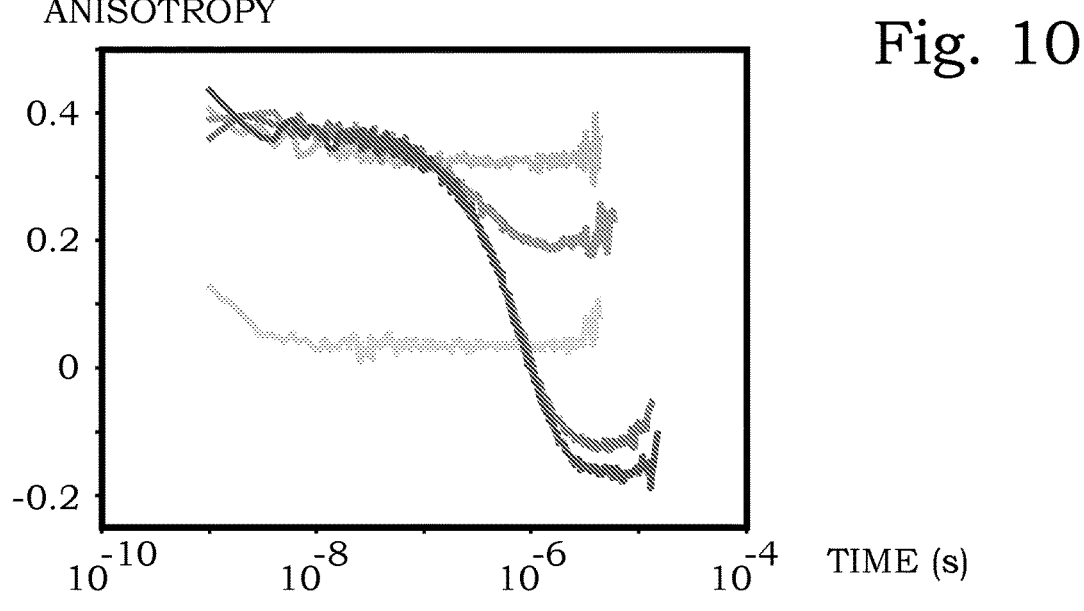

The embodiment above can be described as a STARSS-RESOLFT method with off state photo-selection. As shown in FIG. 10 it uses a non-polarized on-switching followed by a continuous readout with linearly polarized light, which acts also as a long off-switching pulse. Dual channel polarized detection monitors the anisotropy of the decreasing fluorescence due to off-switching molecules preferentially oriented with the polarization plane. Here diffusion of fresh active molecules into the polarization plane and switching off rate are two competing processes generating a time-dependent observable that is strongly dependent on the diffusion coefficient. Tuning the rate of off-switching will be crucial to adjust the temporal sensitivity range of the experiment with typical rotational diffusion time scales. This embodiment is an alternative to the earlier presented ones to enable read-out of molecules of larger size by switching the off state. It can be tested on a large variety of reversibly switchable probes, extending the flexibility of the method.

The hatchings in FIG. 10 are similar as in FIG. 6. Simulated observables for the proposed experiment are also shown.

Different fluorescent probes can be used. STARSS-RESOLFT needs fluorophores probes that can be efficiently switched into long lived dark states. Reversible switchable organic dyes and fluorescent proteins are optimal candidates, especially for high sensitivity experiments and in living cells, where repetitive measurements are needed. In TR-FA, for example for experiment in solution, phosphorescence and ground-state-depletion from triplet states can be used, but the higher light intensities needed and the lower SNR make the direct readout of triplet states less suitable for live cell experiments. Nevertheless, the use of optically activated delayed fluorescence (OADF) from triplet states of organic dyes and fluorescent proteins is another viable alternative to achieve reversible switchable fluorescent states for STARSS. In this case, light of a suitable wavelength can be used to excite the triplet dark state inducing a reverse inter-system-crossing to the excited singlet state giving in the end a fluorescence signal. Thus, effectively acting analogously to traditional reversibly switchable dyes and fluorescent proteins in STARSS-RESOLFT experiments.

Illumination source are also needed. STARSS-RESOLFT is compatible with different laser source such as LED or solid-state lasers. The requirement is rapid temporal modulation (ns-us) which is easily available in LED base laser technology or with the use of acousto-optic devices.

Detectors and acquisition cards are also necessary. For STARSS-RESOLFT the choice of detector is flexible and can be done in accordance to the length of the curve to follow. For example, a TF-RA curve in the order of hundreds of microseconds can be probes in temporal steps of 1-10 µs with APD-PMT and fast camera.

Concerning the optical system, STARSS is compatible with wide-field illumination, focused light, light sheet and total internal reflection as well as low and high NA objective lens. The polarization distribution in the 3 spatial coordinates of the detected volumes can be controlled and tuned by changing the properties of the incoming light. This can allow the STARSS concept to be applied with different efficiency to molecules distributed preferentially in x,y or z and it can be used to selected specific orientations and twig the experiment in accordance to the need of a specific biological application.

The different method embodiments described above can be implemented in a system for measuring polarization and anisotropy of fluorophores. The different particular embodiments may of course be implemented in systems particularly adapted to each embodiment. However, the requirements are closely related and here below, an embodiment of a system for measuring polarization and anisotropy of fluorophores will be described, which is capable of performing all of the above-described method embodiments.

Figure 11:
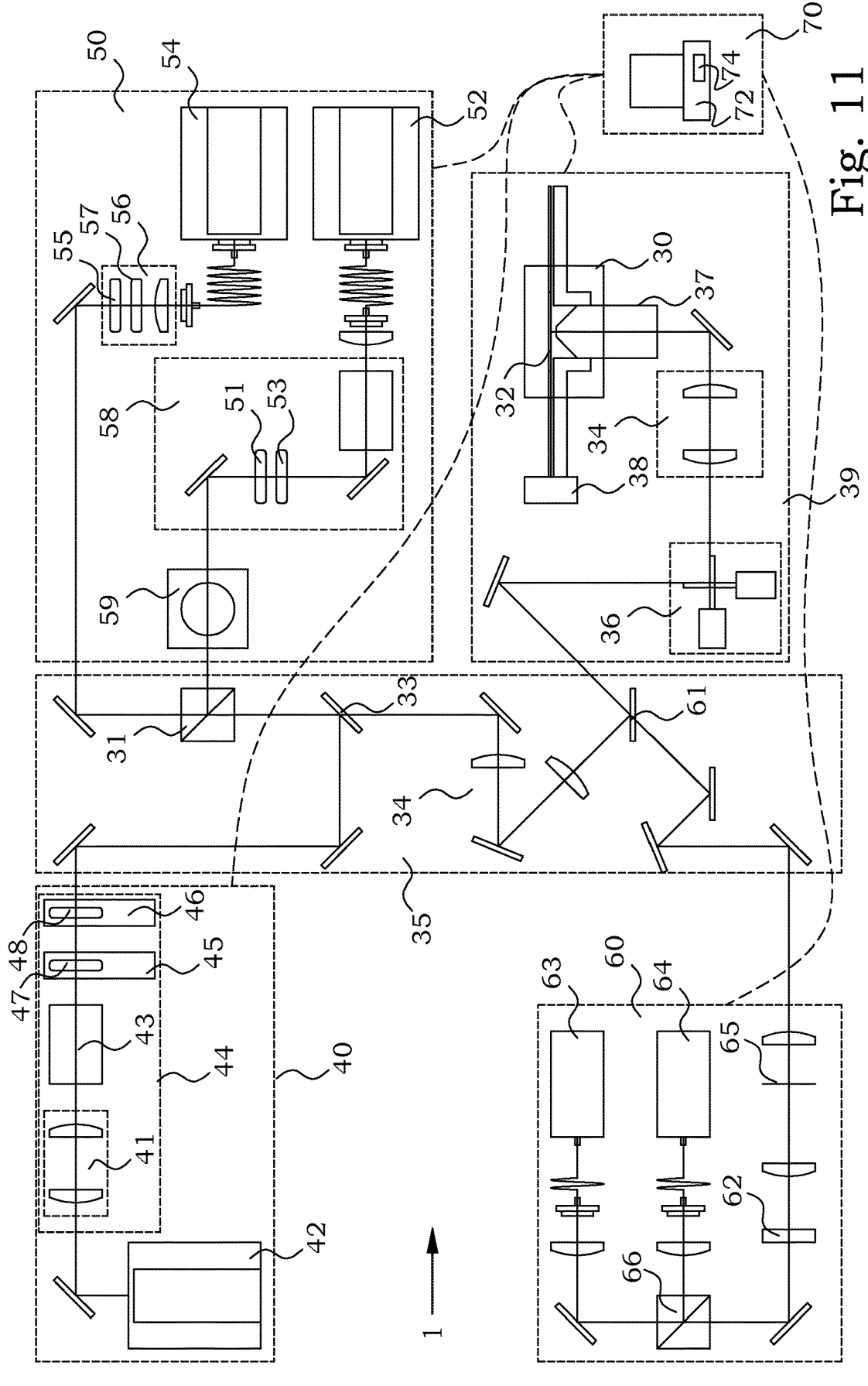
FIG. 11 is a schematic illustration of an embodiment of a system for measuring polarization and anisotropy of fluorophores.

FIG. 11 illustrates schematically a system 1 for measuring polarization and anisotropy of fluorophores. A sample volume 30 is configured for receiving a sample 32. A first illumination arrangement 40 comprises a first laser 42. The first laser 42 is arranged for illuminating at least a part of the sample volume 30 by a first activation light pulse. This is ensured by an interconnecting optical system 35. The first laser 42 has a wavelength that is suitable for switching the reversibly switchable fluorophores into a long-lived photo-selected state. A second illumination arrangement 50 comprises a second laser 52. The second laser 52 is arranged for illuminating the at least a part of the sample volume 30 by a read-out light pulse. This is also ensured by the interconnecting optical system 35.

A detector 60 is arranged for detecting light emitted from the at least a part of the sample volume 30. This is also provided by the interconnecting optical system 35. A control arrangement 70 is configured for controlling a common operation of the first illumination arrangement 40 and the second illumination arrangement 50. Typically, the control arrangement 70 comprises a processor 72 and software programs 74 for performing the actual control. One of the first illumination arrangement and the second illumination arrangement is configured for providing non-polarized or circularly polarized light as the first activation light pulse or the read-out light pulse, respectively and wherein the other one of the first illumination arrangement and the second illumination arrangement is configured for providing linearly polarized light as the first activation light pulse or the read-out light pulse, respectively.

In a preferred embodiment, the second illumination arrangement 50 is further configured to emit a deactivation light pulse before the first activation light pulse is emitted. The, wherein said deactivation light pulse is a non-polarized pulse of a wavelength suitable for switching said reversibly switchable fluorophores being in said long-lived photo-selected state into a non-photo-selected state. In the particular embodiment of FIG. 11, a third laser 54 is used for this purpose.

The particular embodiment of FIG. 11 is a set-up adapted for microscopy. Three lasers 42, 52, 54 from Cobolt AB, were chosen because of the fast modulation in time with sub microsecond accuracy. The rise and fall time is less than 10 nanoseconds. The first laser 42 emits light with a wavelength of 405 nm and the second 52 and third 54 lasers emit light with a wavelength of 488 nm (Cobolt AB 06-MLD, Solna, Sweden). The first laser 42 is the on-switching laser and is optically connected to polarizing optics 44. The laser light is expanded using a 4f telescope 41 and then the polarization is cleaned using a Glan-Thomson polarizing prism 43. Finally controlled with achromatic λ/2 48 and λ/4 47 plates mounted on remotely controlled rotating stages 45, 46. With this configuration it is possible to calibrate several polarization states of the 405 nm beam from the first laser 42, e.g., vertical (V), horizontal (H), and circular (C). It is even possible to reliably inter-convert among them in few seconds.

Two off-switching lasers, i.e., the second laser 52 and the third laser 54, are installed in the setup. In the pulse schemes where just one is used, the second laser 52 beam is selected. Both of the beams have fine tuning of the polarization by second polarizer optics 58 and third polarizer optics 56, respectively, with respective achromatic λ/2 53, 57 and λ/4 51, 55 plates. A removable spiral 0-2π phase plate 59 is present on the beam line from the second laser 52. This is used for the generation of a donut point-spread-function only in STARSS/RESOLFT super-resolution experiments. Both off-switching beams, from the second and third lasers 52, 54, respectively, are combined using a 50:50 beam splitter 31. They are then further combined with the on-switching light from the first illumination arrangement 40 using a dichroic mirror 33.

In a sample section 39, a relay 4f 1:1 telescope 34 is used to conjugate the plane of the phase plate with a galvo scanner 36 position. The combined beams are X-Y scanned and sent to the microscope stand 37, in this particular embodiment a Leica microscope stand, where the sample 32 is held and scanned in the Z direction using a piezo stage 38.

The emission light was de-scanned and decoupled using a dichroic mirror 61 and filtered using a band pass filter 62. The detection light is filtered using a common confocal pinhole 65, equivalent to about one Airy units. A single pinhole is used to improve the balance of the detectors, i.e., rejecting exactly the same amount of out-of-focus light. The emission is then analyzed using a couple of cross polarized single photon avalanche detectors 63, 64, after being split by a polarizing beam splitter 66.

As mentioned above, this setup can be operated in different modes. Thus, in one embodiment, the first illumination arrangement 40 further comprising polarizer optics 44 for the activation light pulse provided between the first laser 42 and the sample volume 30. The activation polarizer 44 is here arranged for polarizing the first activation light pulse in a first direction. The second laser 52 has a wavelength suitable for fluorescent excitation of the reversibly switchable fluorophores in the long-lived photo-selected state.

In a further embodiment, the detector 60 is a polarized detector capable of detecting fluorescent emission polarized in the first direction and detecting fluorescent emission polarized in a second direction perpendicular to the first direction.

In one embodiment, the second illumination arrangement 50 further comprises the third laser 54 and a deactivation polarizer, i.e., the third polarizer optics 56. The third laser 54 has a wavelength suitable for switching the reversibly switchable fluorophores that is in the long-lived photo-selected state into a non-photo-selected state by a deactivation light pulse. The deactivation polarizer is positioned between the third laser 54 and the sample volume 30 and is arranged for polarizing the deactivation light pulse in the second direction. The control arrangement 70 is further configured for providing the deactivation light pulse after providing the first activation light pulse but before providing the read-out light pulse.

Preferably, the control arrangement is configured for causing the second laser 52 to emit continuously or intermittently repeating during a time interval of at least 1 ms, preferably of at least 10 ms and most preferably at least 100 ms.

In another further embodiment, the control arrangement 70 is configured for controlling the first illumination arrangement 40 to apply a second activation light pulse of the wavelength suitable for switching the reversibly switchable fluorophores into a long-lived photo-selected state. The second activation light pulse is polarized in the first direction. The applying of the second activation light pulse is delayed by a non-zero delay time with respect to the first activation light pulse.

Preferably, the control arrangement 70 is configured to operate the first illumination arrangement 40 and the second illumination arrangement 50 to repeat the first activation light pulse and the read-out light pulse with different delay times. The second illumination arrangement 50 is further configured to emit a deactivation light pulse between each repetition. The deactivation light pulse is a non-polarized or circularly polarized light pulse of a wavelength suitable for switching the reversibly switchable fluorophores that are in the long-lived photo-selected state into a non-photo-selected state.

In the above embodiments, the first illumination arrangement 40 has been operated to provide linearly polarized light pulses. However, the controllable rotating stages 45, 46 also enables provision of circularly polarized light.

In one embodiment, the second illumination arrangement 50 further comprising a read-out polarizer, i.e. the second polarizer optics 58, provided in an optical path between the second laser 52 and the sample volume 30. The read-out polarizer is arranged for polarizing the read-out light pulse in a first direction. The read-out light pulse is a deactivation light pulse of a wavelength suitable for switching the reversibly switchable fluorophores that are in the long-lived photo-selected state into a non-photo-selected state.

The detector 60 is preferably configured for detecting emission associated with the deactivation polarized in the first direction and for detecting emission associated with the deactivation polarized in a second direction, perpendicular to the first direction.

Preferably, a duration of the first activation light pulse is adapted to cause a majority of all the reversibly switchable fluorescent proteins, and more preferably more than 95% of all the reversibly switchable fluorescent proteins, being irradiated to switch into the long-lived photo-selected state.

The embodiment illustrated in FIG. 11 has the ability to operate in different STARSS by controlling the operation of different components in the system. If only one STARSS operation mode is of interest, the system can be simplified in that some controllability is removed. Such modifications are easily understood by anyone skilled in the art.

The flexibility is, however, in most cases experienced as a large advantage. In the present embodiment, the control of the setup is performed using a field-programmable gate array (FPGA).

The setup is in this particular embodiment controlled using a custom modified LabVIEW FPGA software. The FPGA guarantee high time precision for the control of outputs and data acquisition. Briefly, the the PCIe-7852R card from National Instruments, which is equiped with a Virtex-5 FPGA chip, is programmed to control all digital/analog input/outputs, and it performs photon counting and time binning of the counts. The main loop of the FPGA chip is running at 100 MHz. Three digital outputs allow a fast modulation of the laser beams. The system is able to produce down to 50 ns pulses of laser light that have a clean time profile. This performance is achieved exploiting the in-built fast digital modulation provided by the Cobolt lasers. The pulse scheme is controlled with transistor-transistor Logic (TTL) signals with up to 10 programmable time windows. The time binning of the photons is programmed with a separate synchronized time window, that allow an arbitrary number of bins. The counting is performed inside the FPGA with a second loop running at 200 MHz. Each bin must have a time duration that is a multiple of the period of the main loop of the FPGA, i.e. 10 ns. The galvo scanner and the piezo stage are controlled with three analog output signals. These signals are controlled with a slower repetition rate (750 KHz, limited by the card). The slower rate of analog outputs is not an issue because they are changed only once at the beginning of each pulse scheme. The smart-scanning system implemented in [15] is fully functional also in the STARSS system. A decision time window can be set, and then the photon counts of both detectors are used to decide if the full STARSS pulse scheme is performed. If the thresholds of photon counts are not met, the system can skip directly to the next pixel. The decision time is usually set to tens of microseconds while a complete STARSS pulse scheme lasts few milliseconds.

The applications for the above described methods and apparatus are many. A burden of conventional TR-FA is the duration of the observable time window, which restricts the size of molecules which can be studied. By the methods described here, molecular states are used that feature long lived lifetime (μs-min) to imprint a molecular orientation distribution, which last tremendously longer than fluorescence (1-5 ns).

Reversibly switchable fluorescent proteins such as rsEGFP or Dronpa variants can be turned ON and OFF several time by the intermittent use of UV and cyan light. It is possible to efficiently (>95%) switch them into an OFF state, where they can last for tens of minutes and even hours. The fluorescence state (ON) is usually the equilibrium state and therefore also long-lived. In the present technology advantage of their reversible photochromism is taken to select a subset of highly oriented molecules, which uniquely populate one of the two states so that their dipole orientation can be followed in extended temporal windows.

As described above, the photo-selection can be done either through the ON or OFF states since they are both long lived fostering different implementation of the concepts.

Figure 12A:
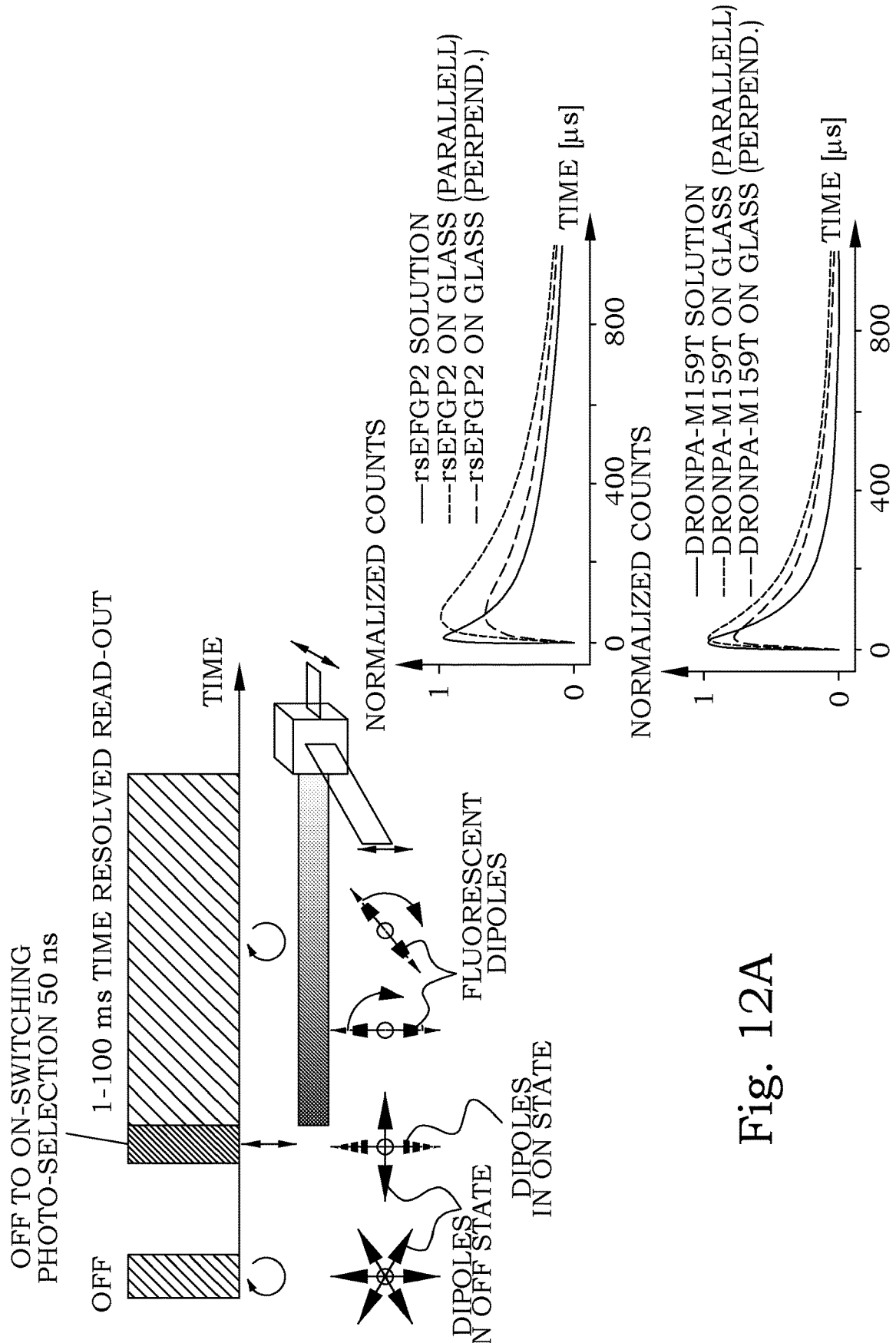
FIG. 12A is a schematic illustration of an embodiment of a STARSS-RESOLFT experiment setup and detected experimental curves.

Different examples of applications have been investigated. One approach that was explored features photo-selection during a short pulse of ON switching light (~100 ns) and a continuum probing pulse of cyan light at 488 nm. An embodiment of a STARSS pulse scheme with photo-selection during ON-switching, circular cyan light for probing and polarization sensitive two-channels detection is schematically illustrated in FIG. 12A. An initial OFF light pulse ensures that all dipoles start in an OFF state. In this particular embodiment, a 50 ns pulse was used for the OFF to ON-switching photo-selection. This approach is the most similar to conventional TR-FA experiments and therefore the recorded time resolved curves share the same theory of TR-FA, which with STARSS is extended in the observable time regime. The fluorescence emitted by the photo-selected molecules is detected in two p and s-polarization sensitive channels, as illustrated in the figure. Simulation show a typical STARSS-rsFP curves in a time regime of $1\text{-}10^3$, which cannot be explored with conventional TR-FA due to short fluorescence lifetime. For this approach to work it is important that that the orientation dipole during photo-switching is maintained and that a sufficient amount of protein can be photo-select rapidly, or faster than their rotational diffusion time. With this aim suitable candidates was the fast switchers rsEGFP2 and DronpaM159T. Both proteins showed STARSS-rsFPs time-resolved anisotropy curves when deposited on a glass surface, as shown in the diagrams in FIG. 12A. The diagrams illustrate experimental data showing the distinct relaxation of the p and s channel for Dronpa and rsEGFP2 after ON-switching photo-selection, and as a comparison rsEGFP2 and DronpaM159T in solution.

Figure 12B:
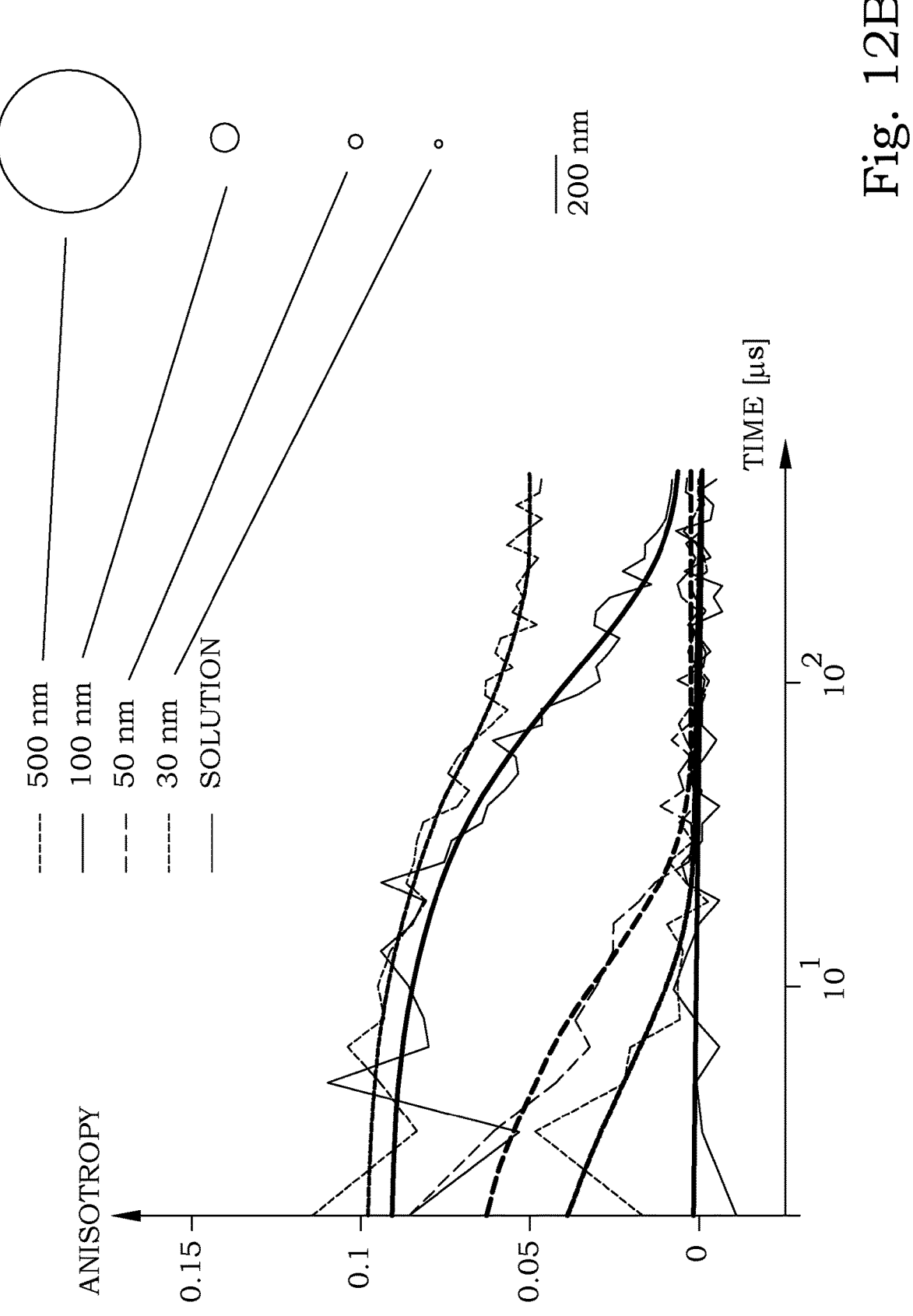
FIG. 12B is a diagram illustrating results deduced from the experiments of FIG. 12A.

After meeting this first requirement, the capability of the method to measure rotational diffusion in a completely unexplored temporal window (μs-ms) far beyond the conventional TR-FA limit (1-20 ns) was demonstrated. Silica spheres of different diameters have been labelled on the surface with rsEGFP2 conjugated via Nichel NTA Hist-tag. Their tumbling in PBS solution were measured with the pulse scheme according to the above embodiments. The read-out is sensitive to the beads size with larger beads rotating slower than the smaller one. FIG. 12B illustrates STARSS-rsFPs experiments on beads with different diameters. The logarithmic x-axis shows the extended temporal observation window up to 1 ms, which allow to measure tumbling of spheres with diameters within 30-500 nm.

By fitting the curve with a dedicated analytical model, the size of the beads could be extracted. In other words, from the rotational diffusion coefficient extracted by the curve fitting, the size of the object is confirmed.

Figure 13A:
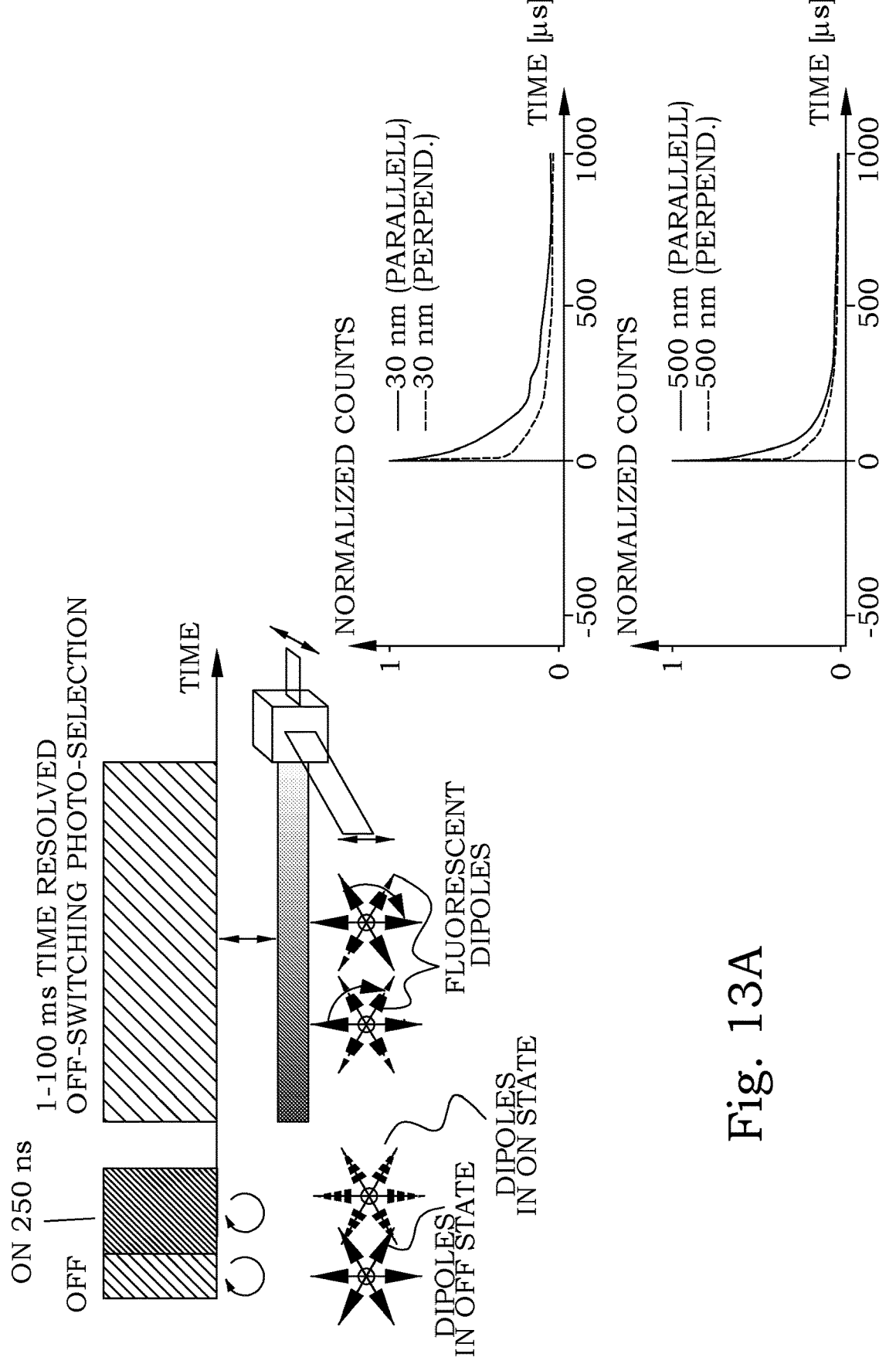
FIG. 13A is a schematic illustration of another embodiment of a STARSS-RESOLFT experiment setup and detected experimental curves.

A second pump probe scheme can also be used to probe molecular dipole orientations across time. In such configuration a subset of molecules were photo-selected exclusively during the OFF-switching kinetics, avoiding potential orientational loss induced by protonation/deprotonation. This approach is more efficient in terms of signal and photo-resistance since it is not limited in ON-switching time. The ON-switching is unrelated and can be induced completely resulting in higher photon numbers/sensitivity. FIG. 13A illustrates such a STARSS pulse scheme with photo-selection during OFF switching, circular ON-switching and polarized sensitive detection. The curves feature a descendent trend introduced by the silencing of molecules with well-defined orientation and their rotational time. Larger beads can be more efficiently photo-select and OFF-switch due to their slow diffusion compared to smaller objects.

The resulting curves are different in shape compared to the method here above and require different theory to be interpreted since it deviates from conventional TR-FA model. An analytical model was provided to interpret the curves which includes a four states photo-switching and diffusion model, which together govern the trend of the curve.

Figure 13B:
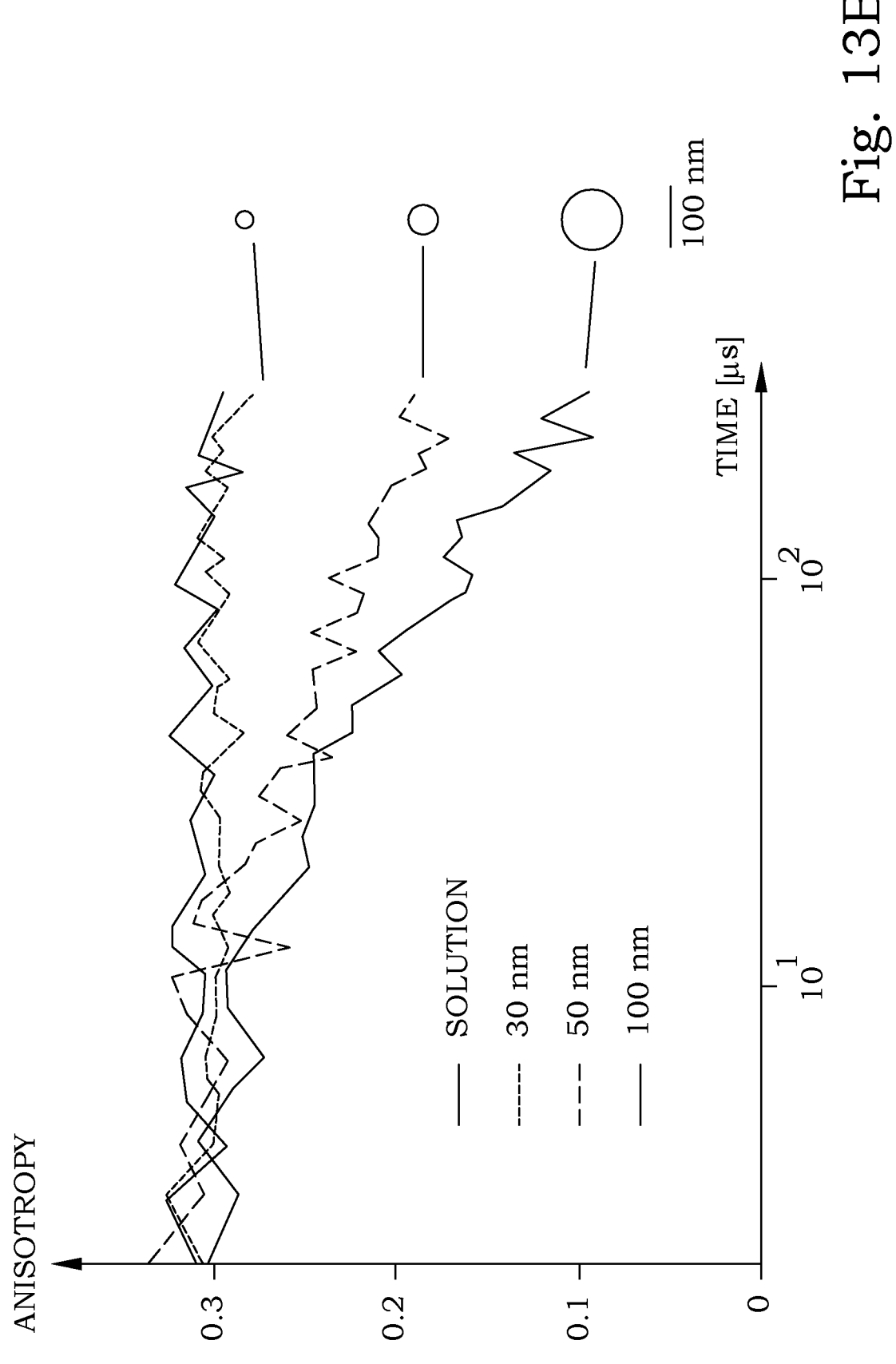
FIG. 13B is a diagram illustrating results deduced from the experiments of FIG. 13A.

Beads with known size were measured in this modality finding faster decaying curves for larger beads where OFF-switching is more efficient than diffusion, as illustrates by FIG. 13B.

Figure 14A:
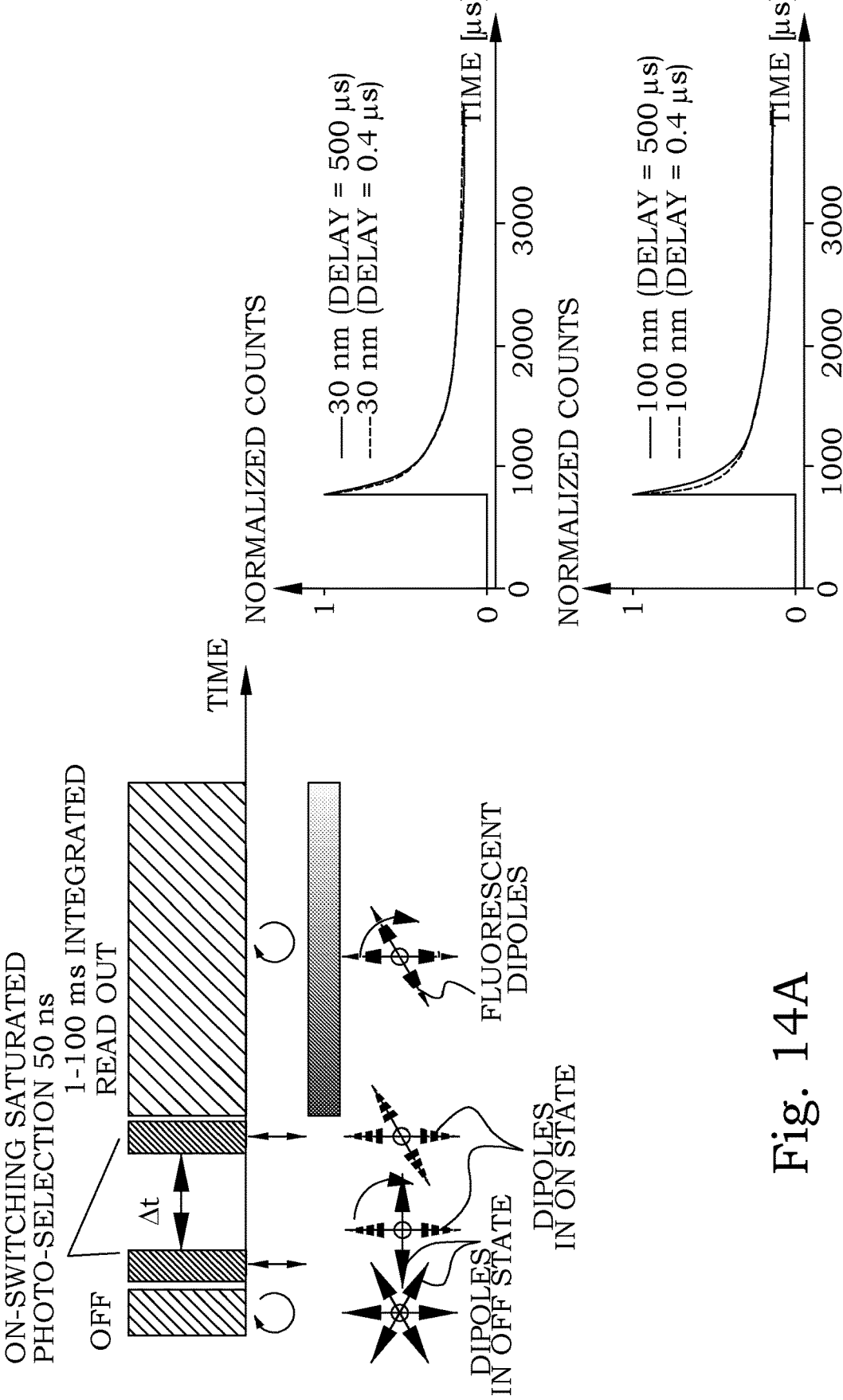
FIG. 14A is a schematic illustration of yet another embodiment of a STARSS-RESOLFT experiment setup and detected experimental curves.

A third STARSS methodological variant consists in photo-selecting during ON switching. FIG. 14A illustrates STARSS photo-selection with polarized ON-switching pulses delivered at two distinct time-points and circular cyan light to read-out the fluorescence detected with polarized-sensitive detection. As in the method above, this variant is also not affected by photo-conversion loss in molecular orientation as they depolarization is measured between two ON-switching pulses. The fluorescence read-out is representative of the increase in photo-selected species withing two consecutive ON-switching pulses. This method does not require a polarization sensitive detection further minimizing the hardware complexity and paving the way for future high-throughput technology.

Figure 14B:
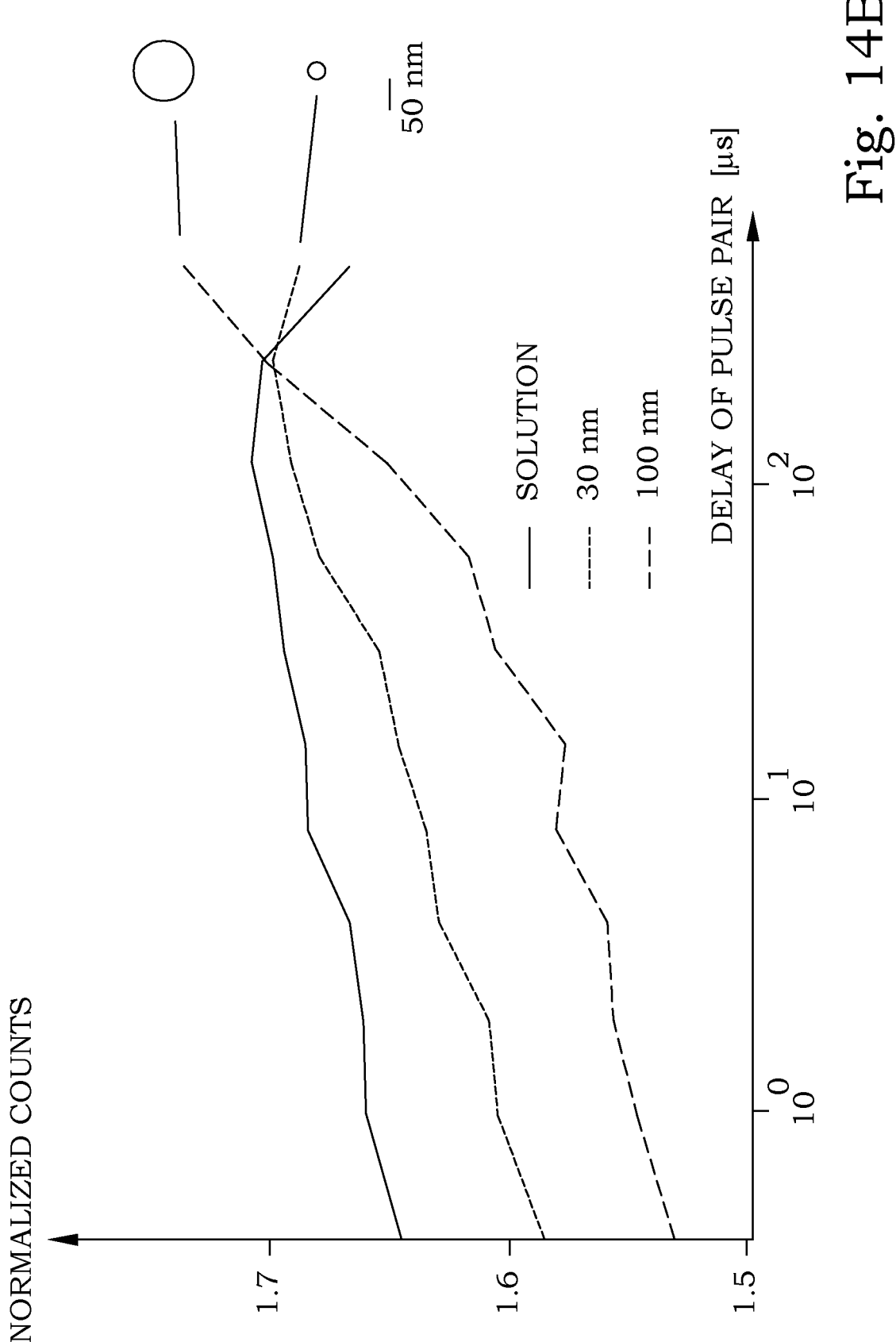
FIG. 14B is a diagram illustrating results deduced from the experiments of FIG. 14A.

The method was validated as well on beads of known size, see e.g. the diagrams in FIG. 14A. Here the trend of curve is raising for larger beads where diffusion is slower compared to the ON-switching kinetic. Since the ON-switching kinetics in most of the rsFPs is the faster kinetics, with this method we are sensitive to a size range spanning from tens to thousands of KDa filling the final gap in size vs temporal observable. FIG. 14B illustrates that curves can probe rotational diffusion in an extended time window and show a raise in counts due to the increased amount of molecules which can be activated by the second pulse due to their relaxation in orientation.

Altogether these three methods enable to detect the rotational diffusion of object with size spanning from a GFP in solution with 5 nm hydrodynamic radius to 500 nm large objects covering most of size found in mammalian and eukaryotic proteomes.

STARSS detects molecular rotation and complex formation in situ. The use of rsFP allows genetic tagging of living-cells, borrowing all the recent advances in GFP tagging methods such as improved maturation, fast folding etc. In STARSS additional requirement are imposed by rigid labelling to ensure a representative measure of the tagged protein rotation.

To increase the tag rigidity, three different strategies were followed. Firstly, the link size of the rsEGFP fusion was reduced. STARSS curves of rsEGFP targeted to the mitochondria' outer membrane, directly in living cells, showed lower degree of tumbling, which is in turn associated to higher anisotropy values. Secondly, for the proteins featuring a terminal alpha helix such as Histon H2B, the helix was directly prolonged into the GFP fusion. This way the rigidity of the Histons was probed within dense chromatin regions such as the nucleoli compared to the rest of the cell's nucleus resulting in twice higher anisotropy value. As further control the cells were fixed with different amount of PFA while probing the Histons rigidity, which increased accordingly as shown by the slower and slower trends of the STARSS time-resolved anisotropy curves.

The third strategy for rigid labelling consists of a rational in loop tag of the Gag protein with the reversible switchable probe rsEGFP2, which allowed to measure the formation and organization of the capsid proteins. As the rsEGFP2 in now anchored on two side an increased rigidity of the viral-label molecular complex was obtained compared to previous methods. Different STARSS methods were applied to evaluate the difference in Gag orders in HIV pseudoviral particles. As the virus mature, a protease cleaved away the rsFPs and dismantled the Gag lattice. To facilitate the proper formation of the virion only a subset of the Gag proteins is labelled, i.e. roughly 50% of the Gag protein.

However, the hydrodynamic radius extracted by STARSS curve observable is not affected by labelling densities as much as super resolution imaging methods would since in theory one fluorescence molecule would if rigidly attach, still carry the diffusion properties of the whole complex. In super resolved imaging, on the other hand, since the fluorescence molecules are resolved and visualized to achieve accurate size measurement of the molecular complexes, enough molecules should be detected to represent the tagged protein morphology.

Immature viruses show slow degree of rotation since the rsEGFP2 is rigidly packed in the lattice showing average anisotropy values of 0.05, while mature particles containing cleaved rsFPs rotate much faster resulting in 0.015 average anisotropy values. By fitting the curves, a corresponding size of about 100 nm was found in agreement with the virion size obtained by EM and super resolution fluorescence images.

Such measurement can be done in bulk averaging many viral particles or pushed at the single particle level. Here the reversible switching of each rsEGFP2, which bears in average 1000 cycles can provide enough photons to allow STARSS assessment on each particle.

A second strategy to increase the amount of signal per particle is to use STARSS method 2, c.f. FIG. 7. By switching into the ON state efficiently most of the rsFPs (>80%) per particle we obtain higher SNR further increasing the sensitivity of the methods.

The detected number of photons achieved with STARSS methods 2 was sufficient to further develop STARSS in combination with super resolution microscopy.

As rsEGFP2 is a probe compatible to RESOLFT nanoscopy, images of the virions were recorded detecting a size distribution within 50-150 nm. From the solely information of the size distribution quantified in the super resolved RESOLFT images the distinction of mature and immature particles is not significant. However, by classifying the emitted photons with a polarization sensitive system, as in STARSS method 1 and 2, on the very same microscope difference in tumbling rates of mature and immature particles could clearly be detected.

The new STARSS experiment are then compatible with sensitive imaging system and has the potential to drastically enrich the library of problems that could be addressed with TR-FA including large complexes re-structuring in situ.

The ideas presented in this disclosure can be applied in many fields. Viral detection is one interesting field. STARSS can detect the rotational diffusion of viral particles. With specific fluorescent marker such as nanobodies or antibodies particles can be labeled. STARSS will be used to efficiently detect solution/human fluids containing viral particle from the one uniquely containing nanobodies or antibodies. The difference is in the rotational properties which correlate with the mass. Viral particle rotates slower. The advantage of STARSS is the high sensitivity (down to a single particle level) and minimal requirement in hardware compared to other methods.

Drug screening may also be of interest. The typical question in drug screening is how efficiently antibodies or other drugs bind to the antigen or binding site. The binding induces inevitably a change in mass which can be detected and quantified with STARSS through rotational diffusion measurements. With STARSS, complex formation and protein-protein interactions can be revealed without adding the fluorescent label to a small-drugs, thus not interfering with the binding site.

Moreover, STARSS can be used to detect if specific antibodies are binding to the ribosomes both in prokaryotic and eukaryotic cells. Sub cellular studies focusing on complex formation, binding/unbinding and local environment viscosity. With the high sensitivity of STARSS molecular mass changes can be track down to the single fluorescence molecule level in cells.

This can be done with the sole STARSS observable or in combination with super resolution microscopy.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for measuring polarization and anisotropy of fluorophores, said method comprising the steps of:

activating reversibly switchable fluorophores in a sample, said step of activating comprising applying of a first activation light pulse of a wavelength suitable for switching said reversibly switchable fluorophores into a long-lived photo-selected state;

reading out polarization and anisotropy of said reversibly switchable fluorophores in said long-lived photo-selected state, said step of reading out comprising:

applying of a read-out light pulse; and detecting emission from said reversibly switchable fluorophores;

wherein one of said first activation light pulse and said read-out light pulse comprises one of non-polarized light and circularly polarized light and the other one of said first activation light pulse and said read-out light pulse comprises linearly polarized light;

wherein said first activation light pulse is linearly polarized in a first direction;

whereby said read-out light pulse is a non-polarized or circularly polarized excitation light pulse of a wavelength suitable for fluorescent excitation of said reversibly switchable fluorophores in said long-lived photo-selected state;

wherein said step of detecting emission comprises detecting fluorescent emission polarized in said first direction and detecting fluorescent emission polarized in a second direction perpendicular to said first direction;

applying of a deactivation light pulse of a wavelength suitable for switching said reversibly switchable fluorophores being in said long-lived photo-selected state into a non-photo-selected state, said deactivation light pulse being polarized in said second direction, and wherein said step of applying said deactivation light pulse occurs between said step of activating and said step of reading out.

2. The method according to claim 1, wherein:

said first activation light pulse is non-polarized or circularly polarized;

said read-out light pulse is a deactivation light pulse of a wavelength suitable for switching said reversibly switchable fluorophores being in said long-lived photo-selected state into a non-photo-selected state; and said deactivation light pulse being linearly polarized in a first direction.

3. The method according to claim 2, wherein said step of detecting emission comprises detecting emission associated with said deactivation light pulse polarized in said first direction and detecting emission associated with said deactivation light pulse polarized in a second direction perpendicular to said first direction.

4. The method according to claim 2, wherein a duration of said first activation light pulse is adapted to cause a majority of all said reversibly switchable fluorophores, and preferably more than 95% of all said reversibly switchable fluorophores, being irradiated to switch into said long-lived photo-selected state.

5. The method according to claim 2, comprising the further step of:

deactivating all said reversibly switchable fluorophores in said sample prior to said step of activating.

6. The method according to claim 2, comprising the further step of deducing a tumbling rate based on time evolutions of said emission obtained in said step of detecting.

7. The method according to claim 1, comprising the further step of:

deactivating all said reversibly switchable fluorophores in said sample prior to said step of activating.

8. The method according to claim 1, comprising the further step of deducing a tumbling rate based on time evolutions of said emission obtained in said step of detecting.

9. A method for measuring polarization and anisotropy of fluorophores, said method comprising the steps of:

activating reversibly switchable fluorophores in a sample, said step of activating comprising applying of a first activation light pulse of a wavelength suitable for switching said reversibly switchable fluorophores into a long-lived photo-selected state;

reading out polarization and anisotropy of said reversibly switchable fluorophores in said long-lived photo-selected state, said step of reading out comprising:

applying of a read-out light pulse; and detecting emission from said reversibly switchable fluorophores;

wherein one of said first activation light pulse and said read-out light pulse comprises one of non-polarized light and circularly polarized light and the other one of said first activation light pulse and said read-out light pulse comprises linearly polarized light;

wherein said first activation light pulse is linearly polarized in a first direction;

whereby said read-out light pulse is a non-polarized or circularly polarized excitation light pulse of a wavelength suitable for fluorescent excitation of said reversibly switchable fluorophores in said long-lived photo-selected state;

wherein:

said step of activating further comprising applying of a second activation light pulse of said wavelength suitable for switching said reversibly switchable fluorophores into a long-lived photo-selected state;

said second activation light pulse is polarized in said first direction; and said applying of said second activation light pulse is delayed by a non-zero delay time with respect to said first activation light pulse.

10. The method according to claim 9, further comprising repeating said steps of activating and reading out with different delay times, and wherein a step of deactivating said reversibly switchable fluorophores is performed between each repetition.

11. The method according to claim 9, comprising the further step of:

deactivating all said reversibly switchable fluorophores in said sample prior to said step of activating.

12. The method according to claim 9, comprising the further step of deducing a tumbling rate based on time evolutions of said emission obtained in said step of detecting.

13. A system for measuring polarization and anisotropy of fluorophores, comprising:

a sample volume configured for receiving a sample;

a first illumination arrangement comprising a first laser, said first laser being arranged for illuminating at least a part of said sample volume by a first activation light pulse, said first laser having a wavelength suitable for switching reversibly switchable fluorophores into a long-lived photo-selected state;

a second illumination arrangement comprising a second laser, said second laser being arranged for illuminating said at least a part of said sample volume by a read-out light pulse;

a detector being arranged for detecting light emitted from said at least a part of said sample volume; and a control arrangement configured for controlling a common operation of said first illumination arrangement and said second illumination arrangement;

wherein one of said first illumination arrangement and said second illumination arrangement being configured for providing one of non-polarized light and circularly polarized light as said first activation light pulse or said read-out light pulse, respectively and wherein the other one of said first illumination arrangement and said second illumination arrangement being configured for providing polarized light as said first activation light pulse or said read-out light pulse, respectively;

wherein said second illumination arrangement being further configured to emit a deactivation light pulse before said first activation light pulse is emitted, wherein said deactivation light pulse is a non-polarized pulse of a wavelength suitable for switching said reversibly switchable fluorophores being in said long-lived photo-selected state into a non-photo-selected state.

14. A system for measuring polarization and anisotropy of fluorophores, comprising:

a sample volume configured for receiving a sample;

a first illumination arrangement comprising a first laser, said first laser being arranged for illuminating at least a part of said sample volume by a first activation light pulse, said first laser having a wavelength suitable for switching reversibly switchable fluorophores into a long-lived photo-selected state;

a second illumination arrangement comprising a second laser, said second laser being arranged for illuminating said at least a part of said sample volume by a read-out light pulse;

a detector being arranged for detecting light emitted from said at least a part of said sample volume; and a control arrangement configured for controlling a common operation of said first illumination arrangement and said second illumination arrangement;

wherein one of said first illumination arrangement and said second illumination arrangement being configured for providing one of non-polarized light and circularly polarized light as said first activation light pulse or said read-out light pulse, respectively and wherein the other one of said first illumination arrangement and said second illumination arrangement being configured for providing polarized light as said first activation light pulse or said read-out light pulse, respectively;

wherein:

said first illumination arrangement further comprising polarizer optics for the activation light pulse provided in an optical path between said first laser and said sample volume;

said activation polarizer being arranged for polarizing said first activation light pulse in a first direction; and said second laser having a wavelength suitable for fluorescent excitation of said reversibly switchable fluorophores in said long-lived photo-selected state.

15. The system according to claim 14, wherein said detector is a polarized detector capable of detecting fluorescent emission polarized in said first direction and detecting fluorescent emission polarized in a second direction perpendicular to said first direction.

16. The system according to claim 15, wherein said second illumination arrangement further comprises a third laser and a deactivation polarizer;

said third laser having a wavelength suitable for switching said reversibly switchable fluorophores being in said long-lived photo-selected state into a non-photo-selected state by a deactivation light pulse;

said deactivation polarizer being positioned in an optical path between said third laser and said sample volume and being arranged for polarizing said deactivation light pulse in said second direction; and said control arrangement being further configured for providing said deactivation light pulse after providing said first activation light pulse but before providing said read-out light pulse.

17. The system according to claim 14, wherein said control arrangement is configured for controlling said first illumination arrangement to apply a second activation light pulse of said wavelength suitable for switching said reversibly switchable fluorophores into a long-lived photo-selected state;

wherein said second activation light pulse is polarized in said first direction; and wherein said applying of said second activation light pulse is delayed by a non-zero delay time with respect to said first activation light pulse.

18. The system according to claim 17, wherein:

said control arrangement is configured to operate said first illumination arrangement and said second illumination arrangement to repeat the first activation light pulse and said read-out light pulse with different delay times; and said second illumination arrangement being further configured to emit a deactivation light pulse between each repetition, wherein said deactivation light pulse is a non-polarized pulse of a wavelength suitable for switching said reversibly switchable fluorophores being in said long-lived photo-selected state into a non-photo-selected state.

19. A system for measuring polarization and anisotropy of fluorophores, comprising:

a sample volume configured for receiving a sample;

a first illumination arrangement comprising a first laser, said first laser being arranged for illuminating at least a part of said sample volume by a first activation light pulse, said first laser having a wavelength suitable for switching reversibly switchable fluorophores into a long-lived photo-selected state;

a second illumination arrangement comprising a second laser, said second laser being arranged for illuminating said at least a part of said sample volume by a read-out light pulse;

a detector being arranged for detecting light emitted from said at least a part of said sample volume; and a control arrangement configured for controlling a common operation of said first illumination arrangement and said second illumination arrangement;

wherein one of said first illumination arrangement and said second illumination arrangement being configured for providing one of non-polarized light and circularly polarized light as said first activation light pulse or said read-out light pulse, respectively and wherein the other one of said first illumination arrangement and said second illumination arrangement being configured for providing polarized light as said first activation light pulse or said read-out light pulse, respectively;

wherein:

said second illumination arrangement further comprising a read-out polarizer provided in an optical path between said second laser and said sample volume;

said read-out polarizer being arranged for polarizing said read-out light pulse in a first direction; and said read-out light pulse is a deactivation light pulse of a wavelength suitable for switching said reversibly switchable fluorophores being in said long-lived photo-selected state into a non-photo-selected state.

20. The system according to claim 19, wherein said detector is configured for detecting emission associated with said deactivation polarized in said first direction and for detecting emission associated with said deactivation polarized in a second direction, perpendicular to said first direction.

* * * * *